US011934347B2

(12) United States Patent
Chawla et al.

(10) Patent No.: US 11,934,347 B2
(45) Date of Patent: Mar. 19, 2024

(54) DETERMINING A SHARING RELATIONSHIP OF A FILE IN NAMESPACE SNAPSHOTS

(71) Applicant: EMC IP Holding Company LLC, Hopkinton, MA (US)

(72) Inventors: Rohit K. Chawla, Scotch Plains, NJ (US); Ahsan Rashid, Edison, NJ (US); Soumyadeep Sen, Summit, NJ (US); Marc A. De Souter, Wayne, NJ (US); Morgan A. Clark, South Orange, NJ (US); Alexander S. Mathews, Morganville, NJ (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 17/384,260

(22) Filed: Jul. 23, 2021

(65) Prior Publication Data
US 2023/0027230 A1    Jan. 26, 2023

(51) Int. Cl.
*G06F 16/11*    (2019.01)
*G06F 16/16*    (2019.01)
(Continued)

(52) U.S. Cl.
CPC .......... *G06F 16/128* (2019.01); *G06F 16/164* (2019.01); *G06F 16/1734* (2019.01); *G06F 16/188* (2019.01)

(58) Field of Classification Search
CPC .... G06F 16/128; G06F 16/164; G06F 16/188; G06F 16/1734
See application file for complete search history.

(56) References Cited

U.S. PATENT DOCUMENTS 7,873,619 B1 * 1/2011 Faibish ................ G06F 16/13
                                                                  707/823
8,032,498 B1   10/2011 Armangau et al.
(Continued)

FOREIGN PATENT DOCUMENTS

EP    3477482 A2 *    1/2019

OTHER PUBLICATIONS

Fu et al., "Performance Optimization for Managing Massive Numbers of Small Files in Distributed File System". IEEE 2015.*
(Continued)

*Primary Examiner* — Daniel A Kuddus
(74) *Attorney, Agent, or Firm* — Amin, Turocy & Watson, LLP

(57) ABSTRACT

The technology described herein efficiently determines whether a real inode is shared among views, or owned. In-memory data structures include a view snapshot generation counter that is increased as a snapshot that generates a view is created, and an inode total weight. An in-memory virtual inode cache dataset for a filesystem object associated with the view is instantiated with the value of snapshot generation counter, sharing-related data based on the inode mapping file entry for the object, and an inode access weight. To determine whether the inode is shared (and needs to be split), such as on a write to the object, the in-memory data is evaluated. The real inode is shared if the generation counters are unequal, if the sharing-related data indicates sharing at an intermediate indirect block level, or indicates sharing at the inode level and the inode access weight is less than the inode total weight.

20 Claims, 23 Drawing Sheets

(51) Int. Cl.
*G06F 16/17* (2019.01)
*G06F 16/188* (2019.01)

(56) References Cited

U.S. PATENT DOCUMENTS

| | | | | |
|---|---|---|---|---|
| 8,095,577 | B1* | 1/2012 | Faibish | G06F 16/13 707/823 |
| 8,412,688 | B1* | 4/2013 | Armangau | G06F 16/128 707/703 |
| 8,661,068 | B1* | 2/2014 | Seibel | G06F 16/172 707/825 |
| 8,938,425 | B1 | 1/2015 | Armangau et al. | |
| 8,943,282 | B1* | 1/2015 | Armangau | G06F 16/128 711/126 |
| 8,996,490 | B1* | 3/2015 | Armangau | G06Q 30/02 709/201 |
| 9,135,123 | B1* | 9/2015 | Armangau | G06F 16/172 |
| 10,282,099 | B1* | 5/2019 | Kushwah | G06F 3/067 |
| 11,269,817 | B2* | 3/2022 | Menezes | G06F 11/1456 |
| 2003/0158588 | A1 | 8/2003 | Rizzo et al. | |
| 2003/0158863 | A1 | 8/2003 | Haskin et al. | |
| 2003/0182322 | A1 | 9/2003 | Manley et al. | |
| 2008/0059541 | A1 | 3/2008 | Fachan et al. | |
| 2013/0212136 | A1 | 8/2013 | Nishida et al. | |
| 2014/0006454 | A1* | 1/2014 | Danado | H04M 1/72454 707/796 |
| 2015/0012571 | A1 | 1/2015 | Powell et al. | |
| 2019/0129621 | A1* | 5/2019 | Kushwah | G06F 3/061 |
| 2019/0129810 | A1* | 5/2019 | Kushwah | G06F 11/1453 |
| 2019/0205407 | A1 | 7/2019 | Ying et al. | |
| 2019/0294586 | A1* | 9/2019 | Kushwah | G06F 16/13 |
| 2020/0233751 | A1 | 7/2020 | Gupta et al. | |
| 2020/0250049 | A1 | 8/2020 | Lee et al. | |
| 2021/0303511 | A1 | 9/2021 | Karr | |
| 2021/0349853 | A1 | 11/2021 | Duttagupta et al. | |
| 2021/0374099 | A1 | 12/2021 | Raju et al. | |
| 2022/0004461 | A1 | 1/2022 | Jain et al. | |
| 2022/0188267 | A1 | 6/2022 | Patil et al. | |
| 2023/0028845 | A1 | 1/2023 | Chawla et al. | |
| 2023/0103474 | A1 | 4/2023 | Gunda et al. | |
| 2023/0118349 | A1 | 4/2023 | Mathews et al. | |
| 2023/0121206 | A1 | 4/2023 | Rashid | |
| 2023/0169037 | A1 | 6/2023 | Sen et al. | |

OTHER PUBLICATIONS

Non Final Office Action issued by the U.S. Appl. No. 17/382,496 dated Nov. 14, 2022, 66 pgs.

Final Office Action received for the U.S. Appl. No. 17/382,496 dated Jul. 27, 2023, 41 pages.

Non Final Office Action issued by the U.S. Patent Office for U.S. Appl. No. 17/538,318 dated Dec. 11, 2023, 71 pgs.

* cited by examiner

DETERMINING A SHARING RELATIONSHIP OF A FILE IN NAMESPACE SNAPSHOTS

BACKGROUND

Contemporary data storage systems provide for snapshots of a namespace of a filesystem. When a snapshot is created, e.g., based on a primary filesystem, the snapshot shares files with the primary filesystem. In general, in a filesystem that uses inodes (index nodes) to store file metadata that references corresponding files' data, the instances of a shared file, such as via a primary filesystem view and a snapshot view share the same inode and thus index the same shared file data.

When a write operation to data or metadata of a file occurs, the filesystem needs to know whether that file is shared, so that if shared, the original inode can be preserved. In other words, when a write to a file is requested, and that file is determined to be a shared file, the inode needs to be split, which preserves the original inode for the file in the state that existed before the write operation, and which allocates a new inode for the file in the modified state corresponding to the write operation. For a file that is not shared, referred to as an owned file, no such inode split is needed.

In a large filesystem with many concurrent users, there can be a relatively large number of write operations at any given moment. Determining whether a file is shared or not on each such write operation needs to be efficient so as to not severely impact the performance of the filesystem.

BRIEF DESCRIPTION OF THE DRAWINGS

The technology described herein is illustrated by way of example and not limited in the accompanying figures in which like reference numerals indicate similar elements and in which.

DETAILED DESCRIPTION

The technology described herein is generally directed towards an efficient way to determine if a file is being shared or not, so that if shared, an inode split can be performed with respect to a write operation to preserve the original file state. As will be understood, the technology described herein is based on evaluating select data maintained/cached in-memory (e.g., fast RAM or the like, relative to slower storage such as persistent storage), which provides a rapid and accurate determination of whether a file is shared or not.

It should be understood that any of the examples herein are non-limiting. As one example, the technology is described using a Unix file system, in which virtual inodes map to real inodes to facilitate file sharing across different views of a real filesystem's files. However, the technology described herein can be applied to other data storages/filesystems. As such, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
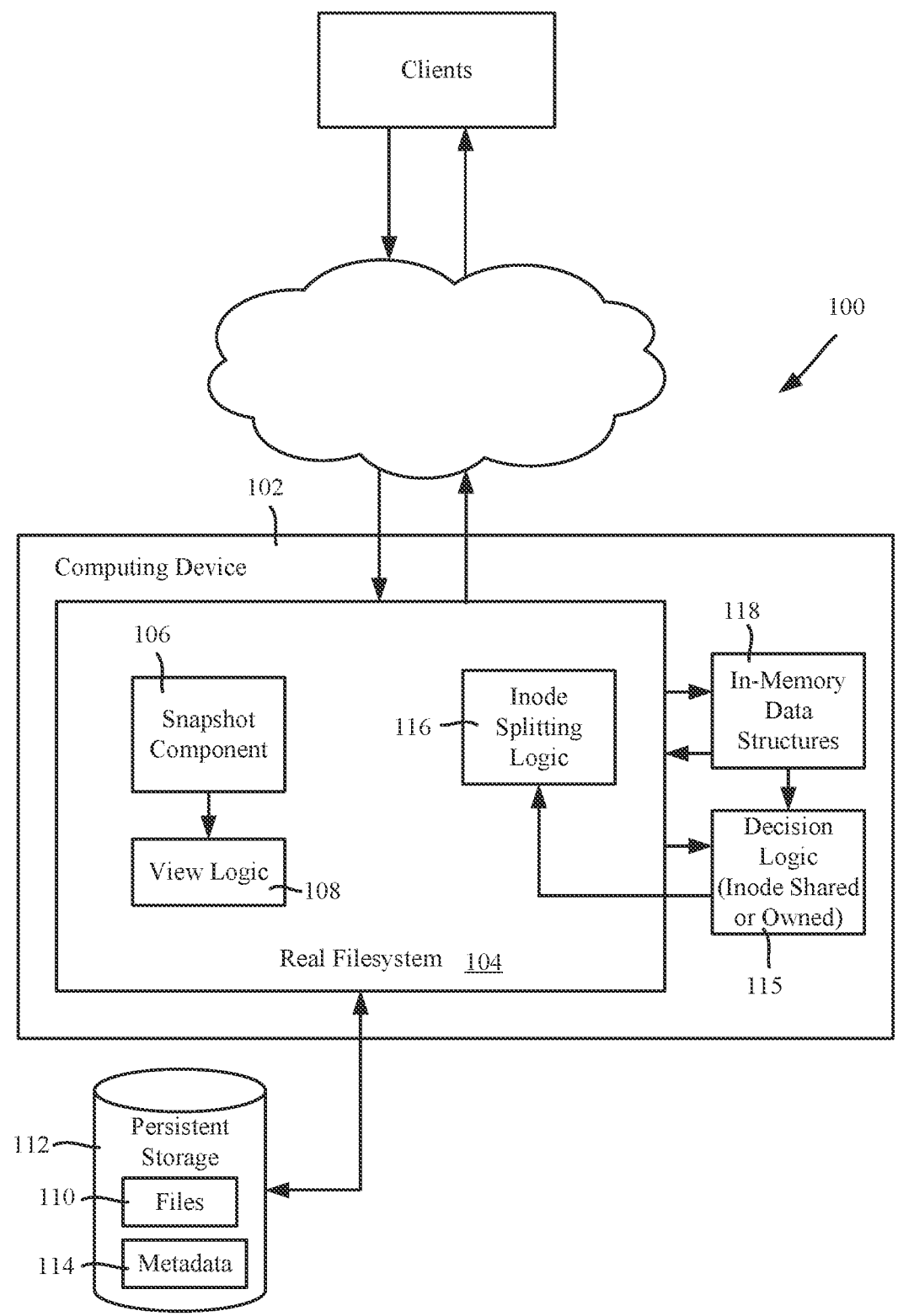
FIG. 1 is a block diagram representation of example components and data-related operations in a data storage system that facilitates snapshots via shared inodes, in accordance with various aspects and implementations of the subject disclosure.

FIG. 1 shows a system 100 comprising a computing device 102 (which can be a group of devices such as an array of distributed computing nodes) that includes a real filesystem 104 as described herein. Typical such computing devices can comprise operating systems, drivers, network interfaces and so forth, however for purposes of brevity, only components generally relevant to snapshots and inode splitting are shown in FIG. 1.

In general and as described herein, the filesystem 104 supports a snapshot component 106, e.g., as a native filesystem component as shown, or alternatively as an external component coupled to the filesystem. When invoked, the snapshot component 106 produces a copy of the filesystem's snapshotted files as described herein, to provide different views of the real filesystem 104 as managed by view logic 108. In general files 110 in persistent storage 112 are shared by having different views' virtual inodes reference the same real inode (stored as metadata 114) for each snapshotted file.

View logic 108 separates the file system's real files into different virtual views of the real file system 104. For example, a first view of the filesystem namespace can access files A, B and C, a second view can access files B, D and F, and so on; file B is thus shared by at least the first view and the second view.

When an I/O operation to a file corresponding to a view is requested by a client (device), a filesystem identifier (ID) and a virtual inode number (VIN) for that view is specified in the file handle that is used to access the file. The VIN maps to a real inode referenced by a real inode number (RIN), by which the real file contents are accessed.

For a write operation, decision logic 115 as described herein (incorporated into or coupled to the file system 104) is invoked to determine whether the inode of the file is shared. If so, inode splitting logic 116 splits the inode by allocating a new inode for the file to be modified by the write. As described herein, the decision logic 115 accesses in-memory data structures to efficiently determine whether the real inode is shared or owned (not shared).

Figure 2:
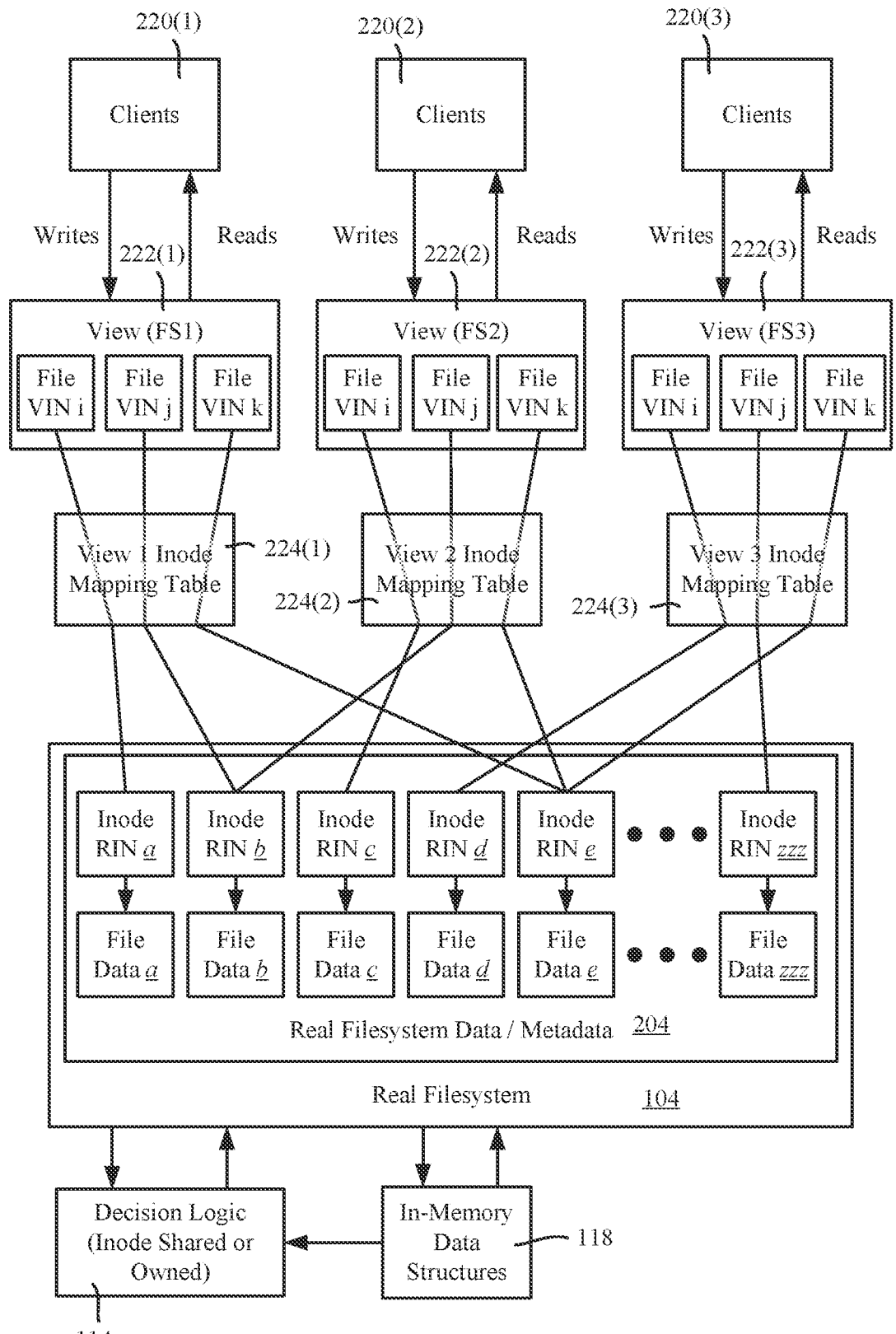
FIG. 2 is an example representation of how virtual inode numbers of views map to real inodes to facilitate sharing of file data, in accordance with various aspects and implementations of the subject disclosure.

FIG. 2 generally shows additional concepts of views and shared files. Clients (e.g., groups of clients 220(1)-220(3) in this example) are associated with respective views 222(1)-222(3) corresponding to virtual filesystems FS1-FS3, respectively. To a client a view appears to be a filesystem of files, although in actuality a view is ordinarily a smaller virtual subset of a real filesystem's data and metadata 204. In the example of FIG. 2, three groups of clients and views are shown, although it is understood that any practical number of views may be present in a given scenario.

The respective views 222(1)-222(3) have respective inode mapping table files 224(1)-224(3) that map virtual inodes to the real inodes of the filesystem. This facilitates file sharing, as, for example, the real inodes numbered RIN b and RIN e (where e and e represent any appropriate real inode numbers) correspond to file b data b and file e data, respectively, which are mapped to by more than one virtual inode number (VIN) among the views.

When a write operation comes into the filesystem 104 from a view, the write operation's file handle identifies a VIN, which is mapped to a corresponding RIN associated with the file data. The real filesystem uses the decision logic 115 (inode shared or owned), which accesses the in-memory data structures 118, to determine if the inode is shared or not. If shared, the inode splitting logic splits the real inode.

Figure 3:
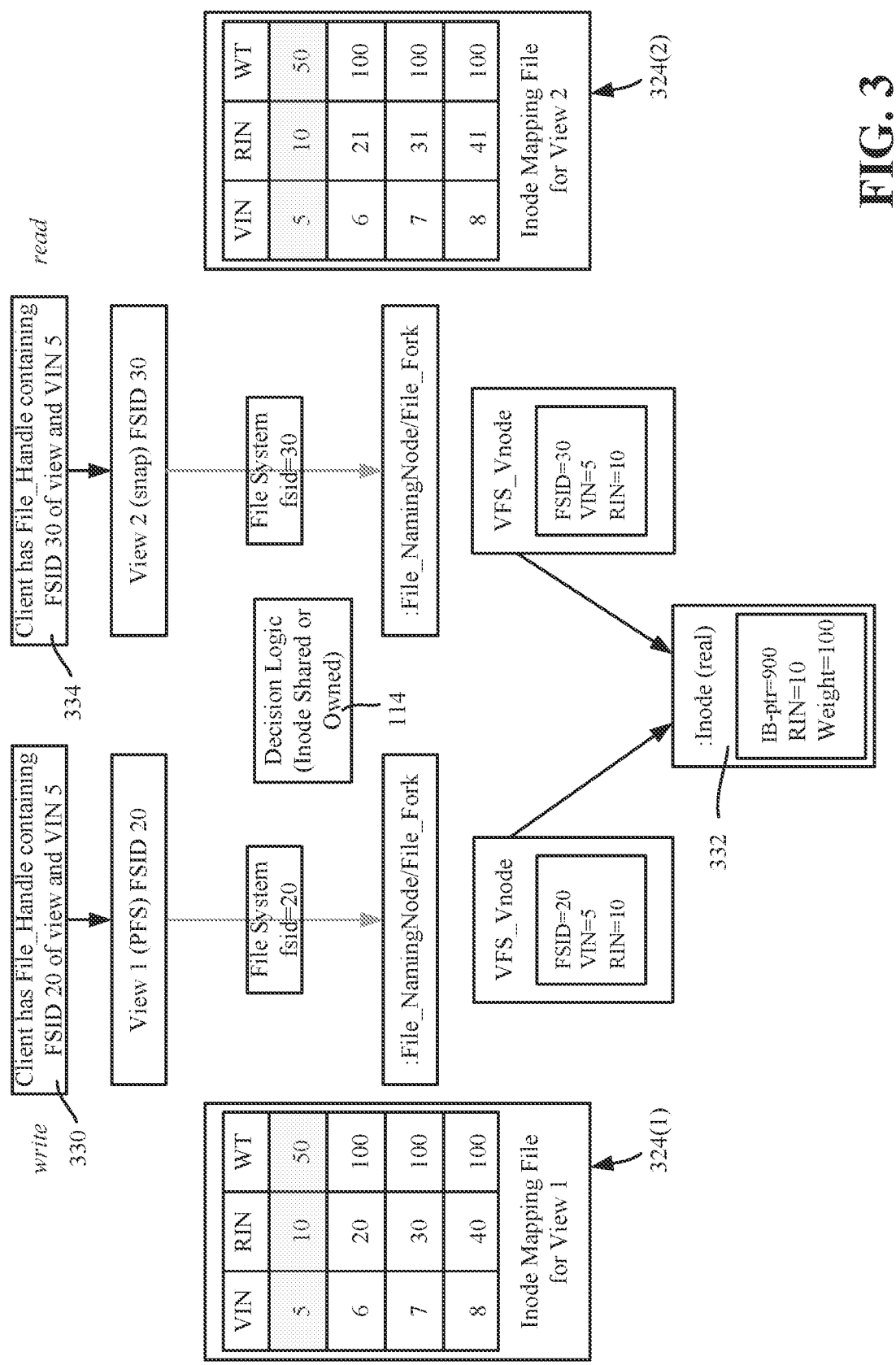
FIGS. 3 and 4 are representations of how a shared inode is split upon a write operation, using decision logic as described herein, in accordance with various aspects and implementations of the subject disclosure.
Figure 4:
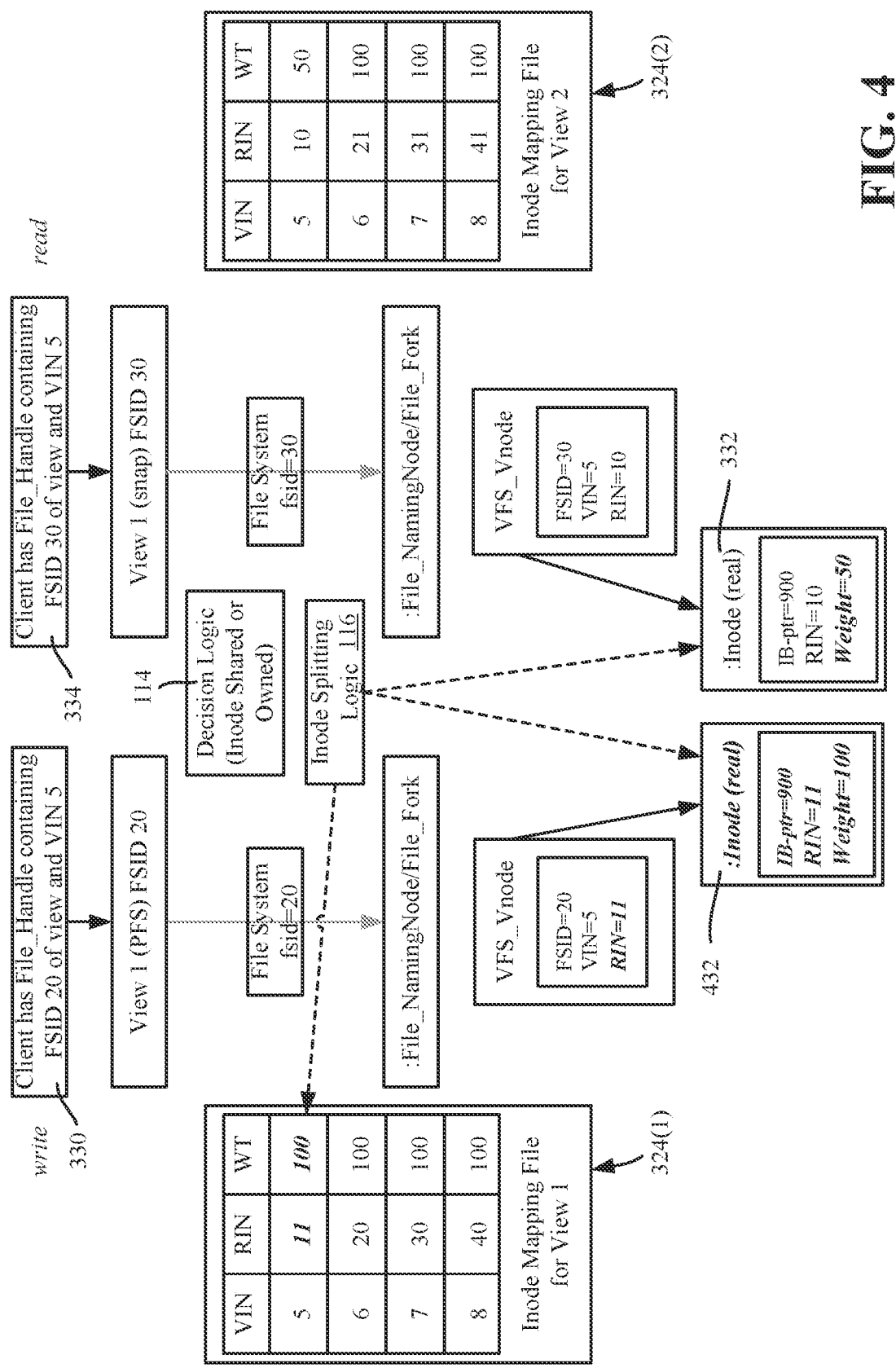

FIGS. 3 and 4 show additional details of splitting a shared inode corresponding to a share filesystem object. As can be seen in FIG. 3, consider that a write operation 330 comes into the view 1 side (e.g., the primary filesystem, or PFS) in which the client request comprises a file handle with a filesystem identifier (FSID) of 20 and a virtual inode number (VIN) of 5. As can be seen from the shaded portion of view 1's inode mapping table (file), the VIN equal to 5 maps to a real inode number (RIN) 10 of a real inode 332 by which the file data is accessible.

Note that the view 2 side (e.g., obtained via a snapshot, or snap) references the same real inode 10, via a file handle containing an FSID of 30 and a VIN of 5, such as via a read operation 334. Thus, the real inode 332 is shared and needs to be split to correctly handle the write operation, otherwise view 2 would read view 1's changed data, which would be incorrect.

Note further that the inode mapping table files 324(1) and 324(2) each has a weight value (e.g., generally corresponding to a reference count) for each VIN and RIN; (additional data exists for each entry, including sharing status). The weight entries are divided when a snap is taken and inodes become shared. For example, view 1's VIN 5 entry (which maps to the real inode 332 represented by RIN 10) in the mapping table file 324(1) has a weight of 50, as does view 2's VIN 5 entry in the mapping table file 324(2), in which the RIN equals 10, and weight equals 50. These two weights sum to the weight 100 in the real inode, meaning that these two views (and no other views) share the real inode. If a third view shared the inode, the weights would still need to total 100 (in a similar example); e.g., view 1 could have a weight of 50, view 2 could have a weight of 30, and view 3 could have a weight of 20. Thus, it is feasible to determine if an inode is shared by the weight in the mapping table for a VIN, in that because view 1's RIN 5 entry has a weight 50 that does not equal the real inode's weight of 100, the real inode has to be shared by at least one other view. However, checking a mapping table, which is typically a large table (e.g., with millions of entries) in slower persistent storage, is an expensive operation and significantly reduces filesystem performance if performed on each write. Thus, the technology described herein provides a significantly more efficient way to determine whether or not an inode (file) is shared.

FIG. 4 shows the general concept of splitting a real inode. Because the inode is shared as seen in FIG. 3, which is determined via decision logic 115 as described herein, a split is needed for the write operation to be properly handled. Thus, after determining that the real inode 332 is shared (e.g., as described herein with reference to FIGS. 5A-20), the inode splitting logic 116 allocates a new real inode 432, numbered RIN 11, for the view 1 side. The inode mapping table 324(1) for view 1 is updated such that VIN 5's entry maps to the new RIN 11; the weight is initialized (to 100 in this example) in the new real inode numbered with RIN 11 as well as the weight in VIN 5's entry. Further, the weight of the original inode with RIN 10 is reduced by view 1, VIN 5's previous weight of 50, as view 1, VIN 5 no longer references this inode of RIN 10. The changes from FIG. 3 to FIG. 4 are shown in boded, italicized text.

Figure 5A:
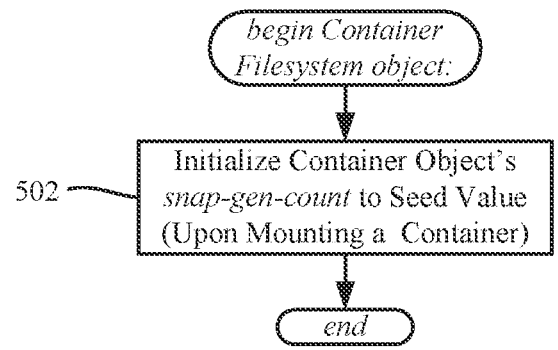
FIGS. 5A-5C are flow diagrams showing example operations related to initializing in-memory data structures used for evaluating whether an inode is shared or owned, in accordance with various aspects and implementations of the subject disclosure.

Turning to efficiently determining whether an inode is shared based on in memory data structures, a real filesystem can be alternatively referred to as a container. One in-memory data structure comprises a container filesystem object, which contains a snap generation counter variable value, referred to as snap-gen-count. As shown in FIG. 5A, upon mounting a container, operation 502 initializes snap-gen-count to some seed value, such as alternatively represented in FIG. 9 by "CONTAINER GEN=3000" at block 980.

Figure 5B:
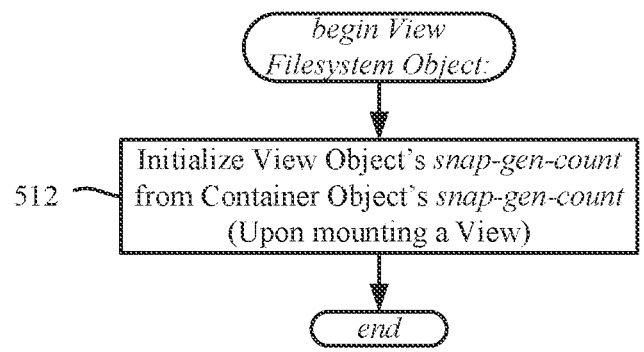

Another in-memory data structure comprises a view filesystem object, e.g., one such object for each view. The view filesystem object similarly comprises a snap generation counter variable value, again referred to as snap-gen-count in the view object. As shown in FIG. 5B, upon mounting a view, operation 512 initializes the view object's snap-gen-count to the container file system object's snap-gen-count, such as alternatively represented in FIG. 9 by "PFS GEN=3000" at block 982; (recall that PFS stands for primary file system, which corresponds to the mounted view in the example of FIG. 9).

Figure 9:
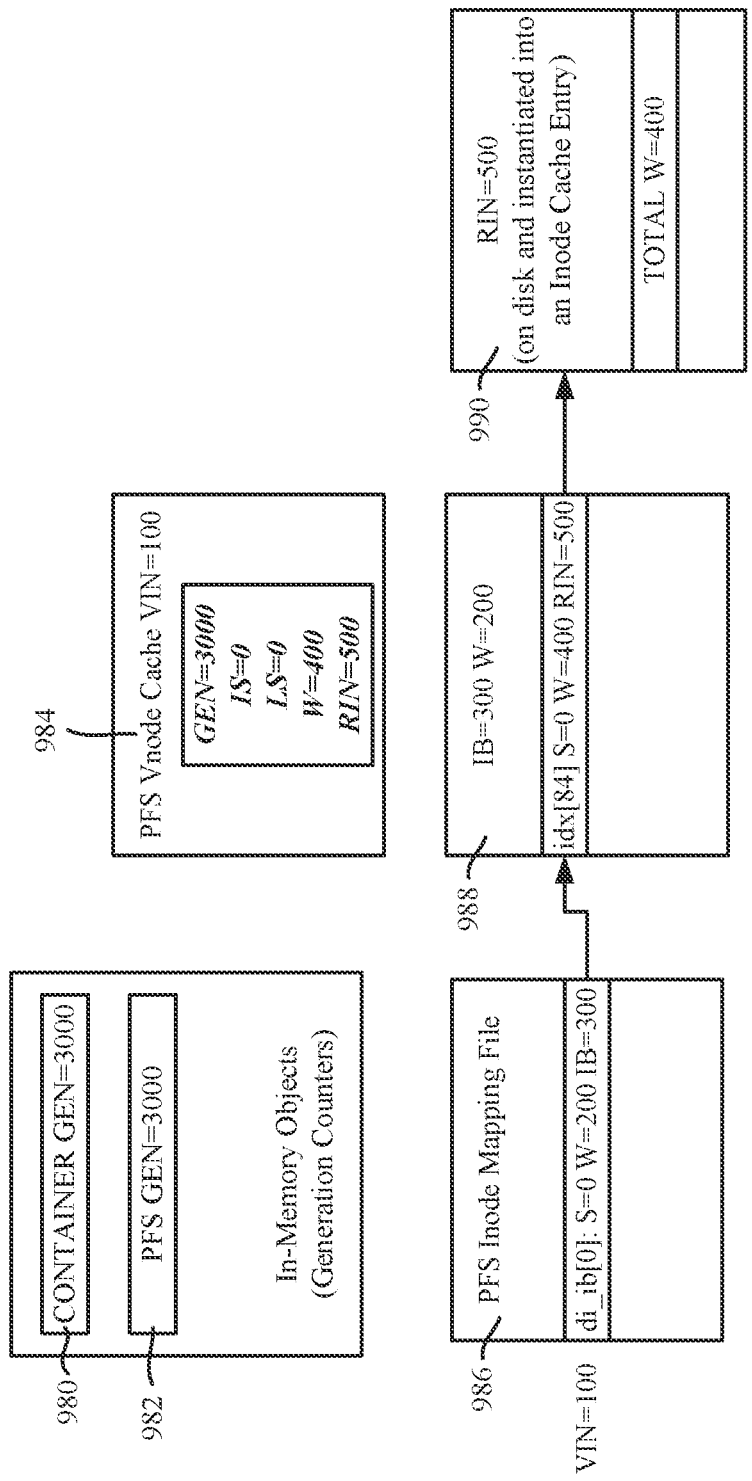
FIGS. 9-11 are representations of data structures over time in a scenario in which a snap is taken after a vnode cache entry is instantiated and a write operation is received, in accordance with various aspects and implementations of the subject disclosure.

FIG. 9 shows another in-memory data structure 984. More particularly, whenever a virtual inode (vnode) data entry indexed by a VIN is first accessed in the corresponding view's mapping table, represented by the PFS inode mapping file 986 in FIG. 9, the inode mapping file's data for the VIN is cached in a vnode cache entry. This avoids having to repeatedly access the inode mapping (table) file (block 986) for repeated reads/writes to the same virtual inode/real inode/filesystem object data. In addition to the RIN and weight for a vnode, the cache entry 984 comprises a dataset that includes a copy of the snap-gen-count at the time that the cache entry 984 was instantiated, and sharing-related data, namely an intermediate shared value (e.g., a single bit referred to as an IS bit, or alternatively referred to as a non-leaf shared bit). The sharing-related data also comprise a leaf shared value (e.g., a bit), (referred to as an LS bit).

Figure 6:
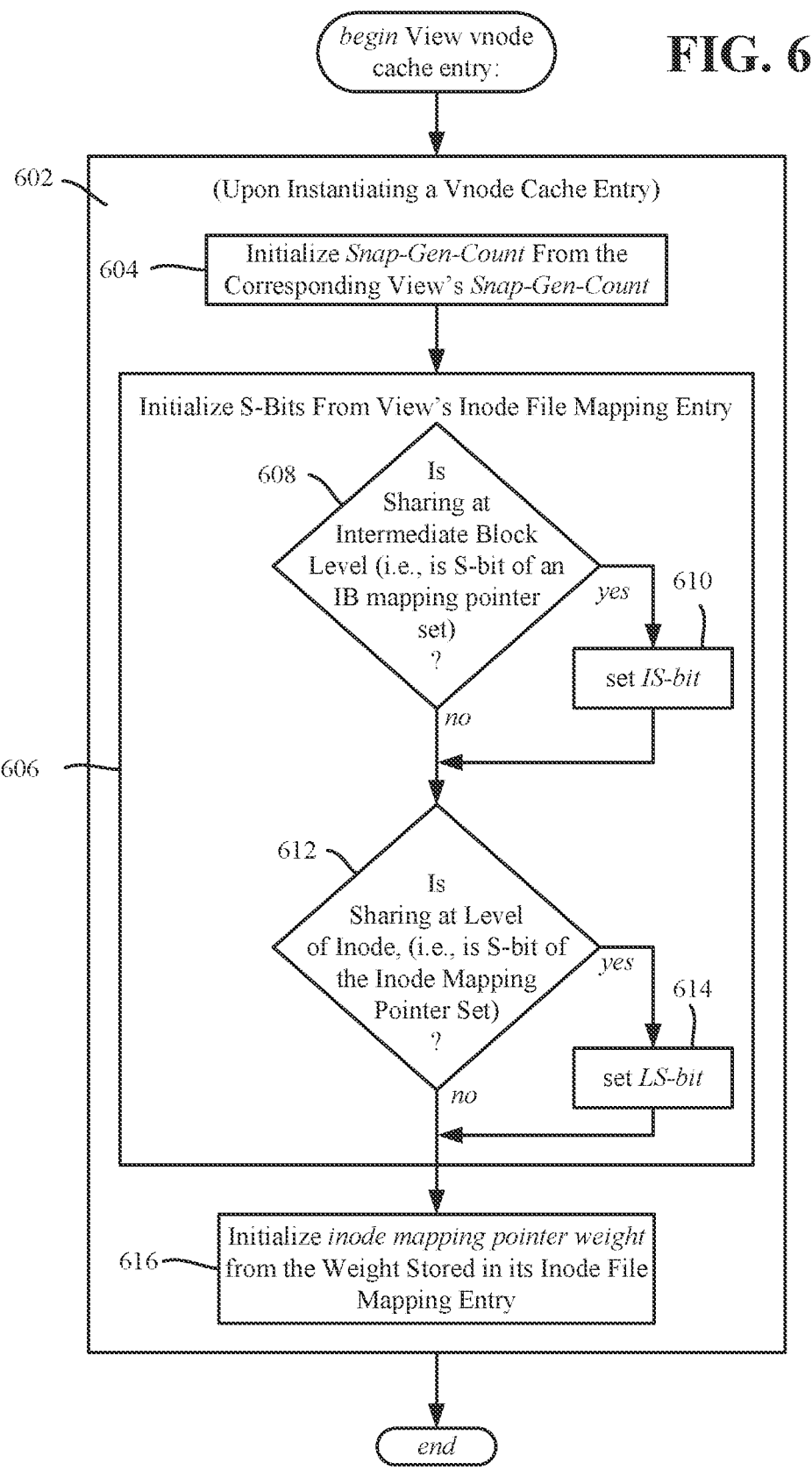
FIG. 6 is a flow diagram showing example operations related to instantiating a virtual node (vnode) cache entry and initializing its dataset, in accordance with various aspects and implementations of the subject disclosure.

FIG. 6 shows initialization operations of a cache entry's dataset upon instantiating a vnode cache entry (operation 602) for a view. Operation 604 initializes the vnode's snap-gen-count from the corresponding view's view snap-gen-count. In the example of FIG. 9, this is shown via GEN=3000 in the vnode cache entry 984 based on PFS GEN=3000 (block 982).

Block 606 is directed towards initializing the sharing-related data (S bits) from the inode mapping file entry. Note that two (or more) virtual inode mapping files can share a leaf indirect block that points to the same real inode, and if so for a VIN, there is sharing at the level of an intermediate indirect block. Sharing, if any, can also be at the level of an inode, that is, two or more leaf indirect blocks can point to the same real inode. Such sharing scenarios, and their S bit values, are further described herein with reference to FIGS. 9-17.

Operation 608 evaluates whether sharing is at the level of an intermediate indirect block, that is, the S-bit of an intermediate indirect block mapping pointer is set; (the intermediate indirect block pointer is in the inode mapping file 986 entry indexed by the VIN). If so, operation 610 sets the IS bit. In the example of FIG. 9, there is no sharing at the intermediate indirect block level, and thus the IS bit is initialized to zero (sharing is false).

Figure 5C:
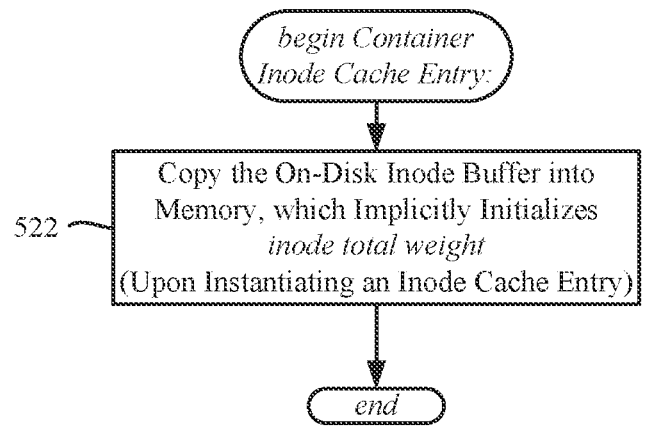

Operation 612 evaluates whether sharing is at the inode level, that is, whether the S-bit of the inode mapping pointer is set in the leaf indirect block entry (in leaf indirect block 988) that points to the real inode 990, (which can be copied into memory as described with reference to FIG. 5C). If so, operation 614 sets the LS bit. In the example of FIG. 9, there is no sharing at the inode level, and thus the LS bit is initialized to zero (sharing is false).

Operation 616 initializes the inode mapping pointer weight in the dataset of the vnode cache entry 984 to the distributed weight at the leaf mapping pointer (block 988) of the inode mapping file 986 (sometimes referred as access-Weight). In the example of FIG. 9, the weight is thus initialized to 400 in the dataset.

As indicated above, an inode cache entry is also instantiated in-memory for rapid, efficient access. Operation 522 of FIG. 5C is performed upon instantiating an inode cache entry, which copies the on-disk inode buffer into memory. Among other data, this operation implicitly initializes (copies) the inode's total weight into the cached entry for this real inode.

FIG. 9 shows the state of the in-memory data structures after creating and mounting the primary file system (PFS), and after writing a file (corresponding to VIN=100) from the primary file system view. As can be seen, the data structures are initialized and/or copied as described with reference to FIGS. 5A-FIG. 7. The PFS inode mapping file contains an entry for VIN=100 (where di_ib[0] indicates a pointer entry) with the shared bit set to zero (false), a weight of 200 (corresponding to the leaf indirect block weight), and a pointer value of 300 to a leaf indirect block (labeled 988); (note that these pointers can be to intermediate indirect blocks or leaf indirect blocks, that is, not pointers to inodes, however in the example of FIG. 9 the indirect block is a leaf indirect block). In turn, the leaf indirect block has at an appropriate index for VIN=100 with a shared bit of zero, a weight of 400 (currently corresponding to the total weight of the real inode), and a RIN value. The PFS vnode cache's RIN value identifies the real inode as cached.

Figure 7:
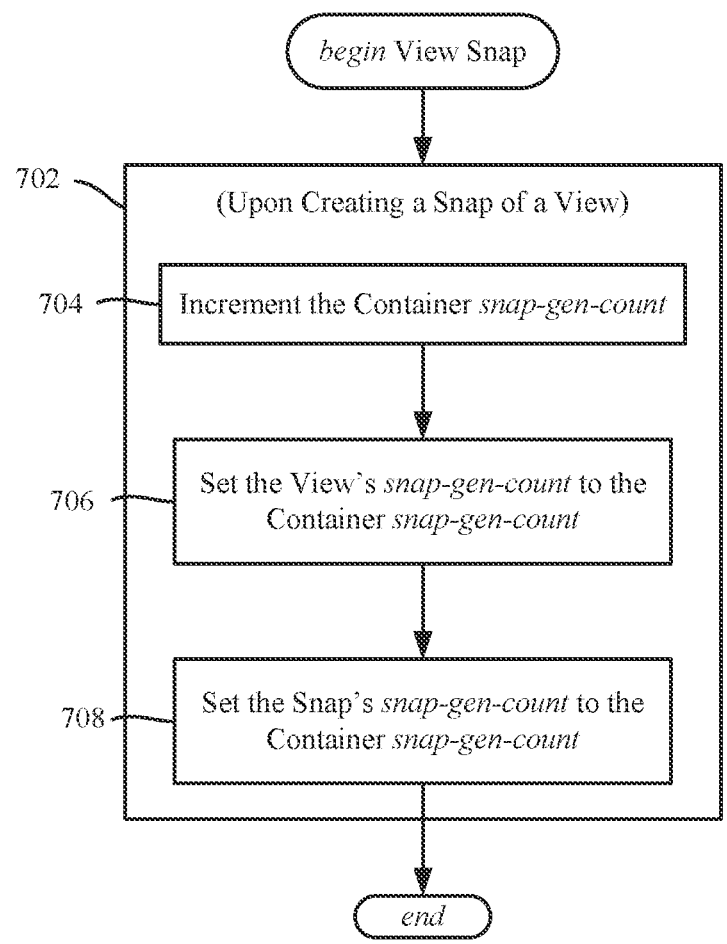
FIG. 7 is a flow diagram showing example operations related to initializing in-memory data structures upon creating a snapshot (snap) of a view, in accordance with various aspects and implementations of the subject disclosure.

FIG. 7 shows operations that occur upon creating a snap of a view, e.g., a snap of the primary file system (block 702). Operation 704 represents incrementing (or otherwise increasing) the container snap-gen-count to reflect that a new snapshot (snap) has been created. Operation 706 sets the view's snap-gen-count to the container's current (now increased) snap-gen-count, and operation 708 similarly sets the snap's snap-gen-count to the container's current snap-gen-count.

Figure 10:
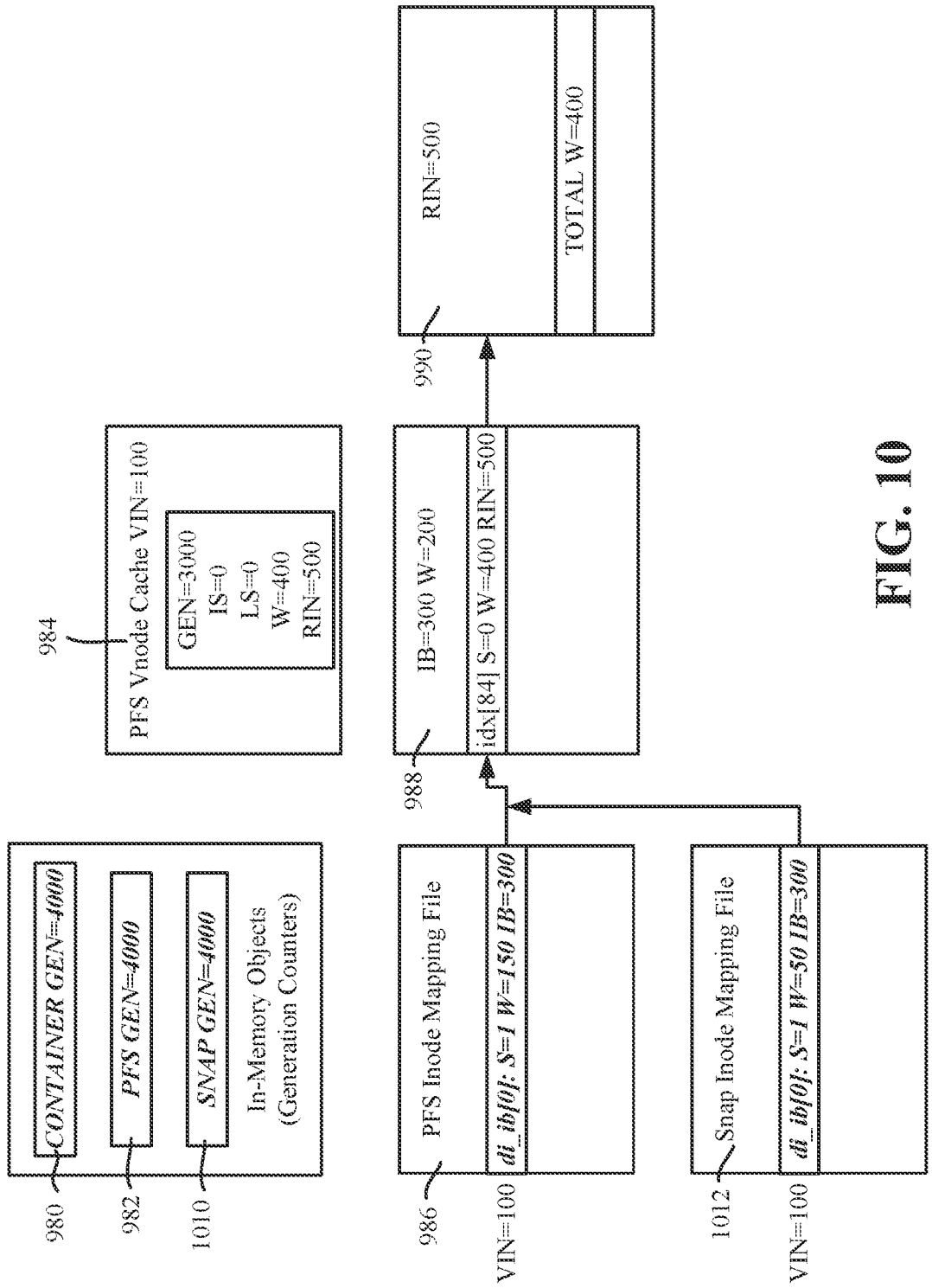

FIG. 10 shows the state of the in-memory data structures of FIG. 9 after the snap has been created. As can be seen, the container's snap-gen-count has increased from 3000 to 4000, (CONTAINER GEN=4000) in the container object, as has the PFS view's snap-gen-count (PFS GEN=4000) in its object. A snap view object is instantiated as part of the snap operation, with its snap-gen-count initialized to 4000 (SNAP GEN=4000) as represented in block 1010.

As part of the snap operation, a snap inode mapping file 1012 is created, by copying the PFS inode mapping file, including an entry for VIN=100, which thus points to the same leaf indirect block for VIN=100, and in turn to the same cached real inode. Note that the pointer from the snap inode mapping file 1012 can be to an intermediate indirect block or a leaf indirect block, (that is, not a pointer to an inode); however in the example of FIG. 10 the indirect block 988 is a leaf indirect block that points to the inode 990. At this time, sharing exists at the level of an intermediate indirect block, and thus the S-bits in the PFS and snap inode mapping files 986 and 1012, respectively, are set to one (sharing is true). Further, the weights are adjusted (from 200 in the previous state of PFS inode mapping file 986) to 150 and 50, in the PFS and snap inode mapping files 986 and 1012, respectively, to match the weight of the leaf indirect block 988. Note that generally the primary filesystem keeps more weight than the snap, because the primary filesystem is more likely to be snapped again.

Note however that any cached entries, including the vnode cache entry 984 for VIN=100 are not updated as part of a snap. There can be a very large number of such entries, making updating each such cache entry inefficient.

Figure 8:
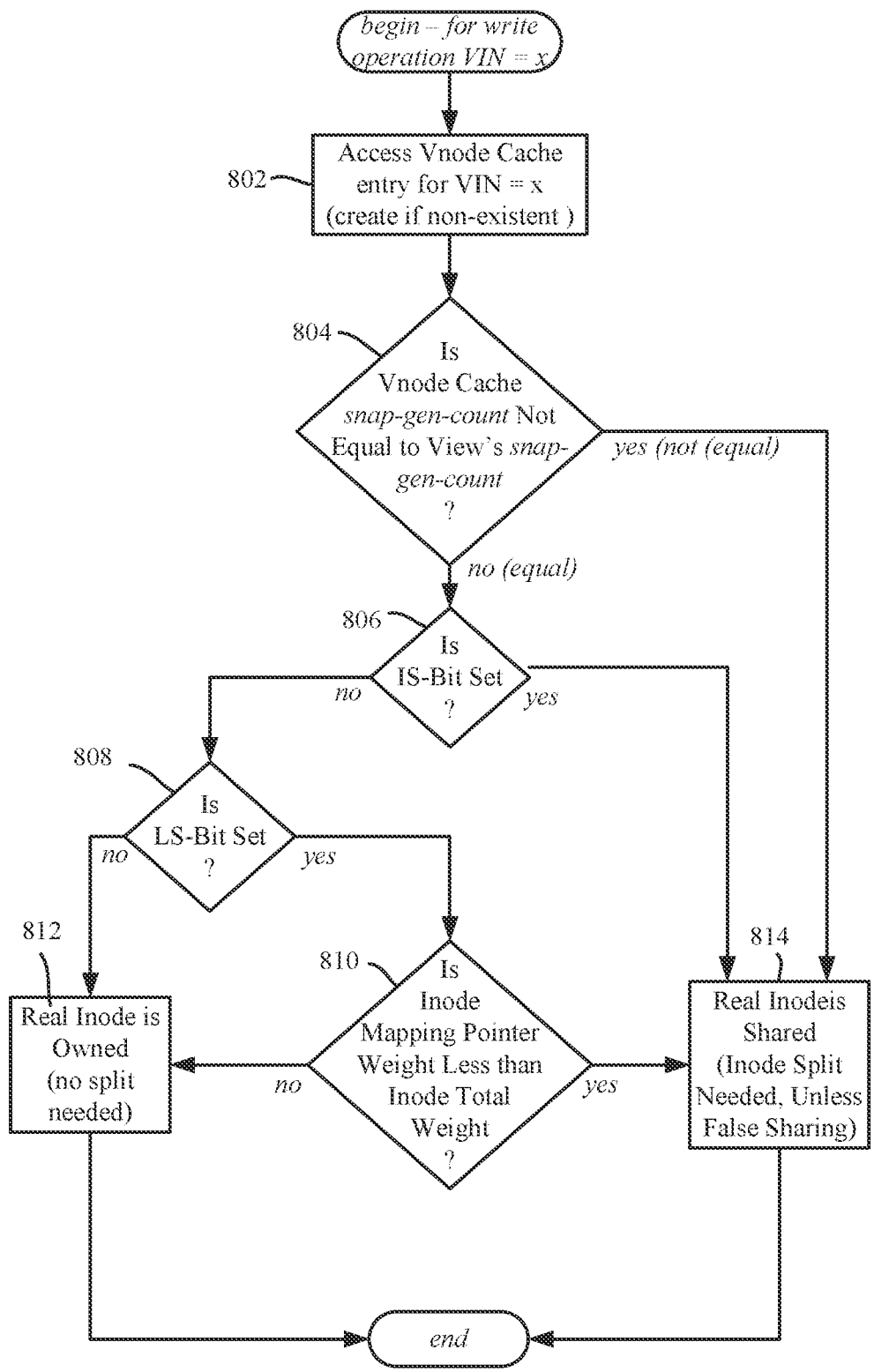
FIG. 8 is a flow diagram showing example operations related to accessing and evaluating in-memory data to determine whether a real inode is shared or owned, in accordance with various aspects and implementations of the subject disclosure.

Notwithstanding, the logic represented in the example operations of FIG. 8 can detect that the real inode is shared following the snap. To this end, when invoked for a write operation to a file corresponding to a VIN x of a view, operation 802 accesses the vnode cache entry. Note that in this example, (to highlight the shared-or-not decision efficiency once a file has been previously accessed), the vnode cache entry exists, such as shown in FIGS. 9 and 10; however if not, an vnode cache entry can be instantiated, after which subsequent write operations will benefit from the efficient logic of FIG. 8.

Figure 11:
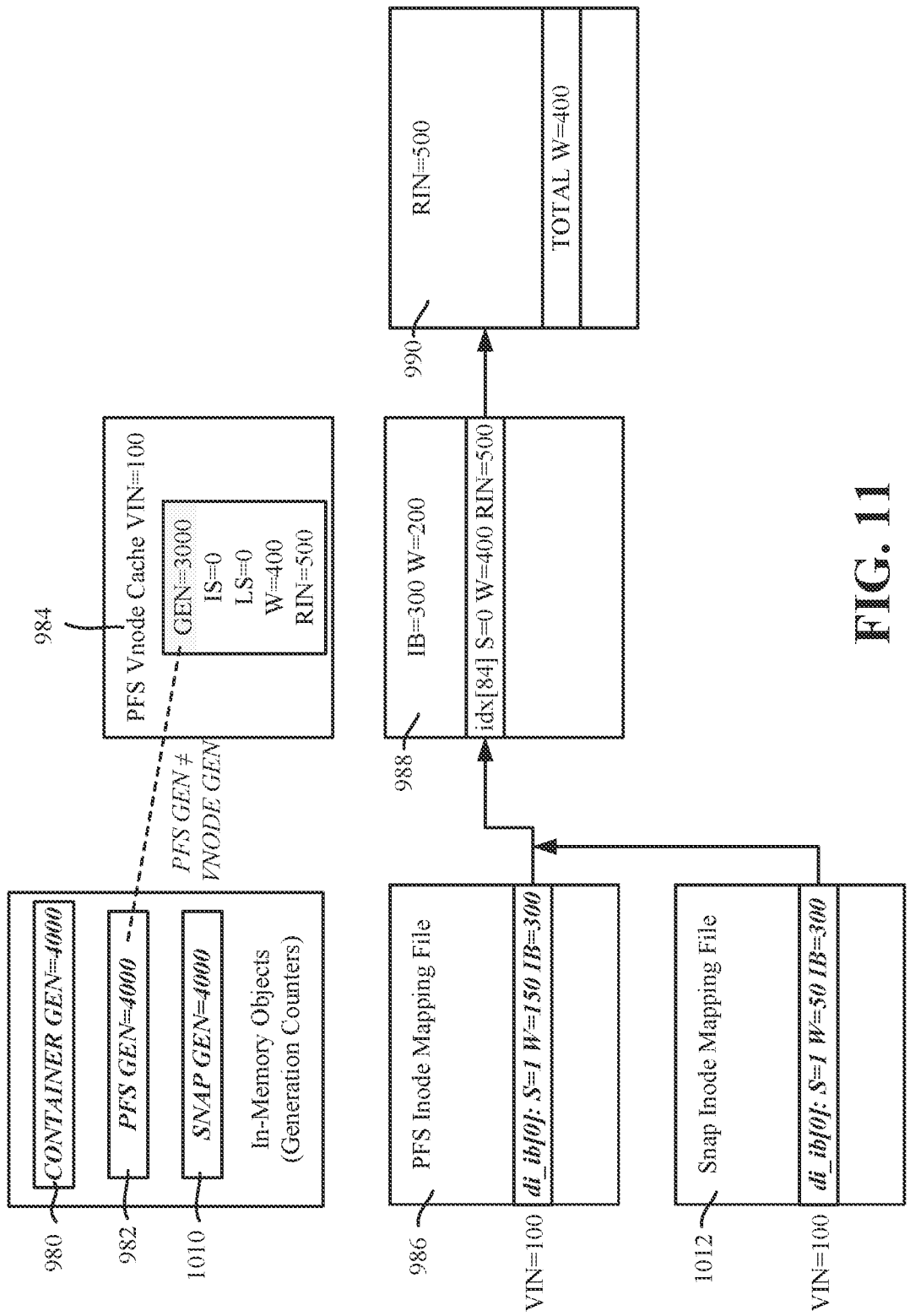

Operation 804 evaluates whether the vnode cache entry's snap-gen-count value is not equal to the view's snap-gen-count value. If so, then a snap has been taken since the time that the vnode cache entry was instantiated, and thus the inode is shared, indicating shared filesystem object data. This is shown in FIG. 11, in that PFS GEN≠VNODE GEN indicates sharing, resulting in operation 804 branching to operation 814, indicating that the real inode is shared and splitting is thus needed. As can be seen, via an efficient look up and compare operation using only in-memory data, sharing is decided.

Figure 12:
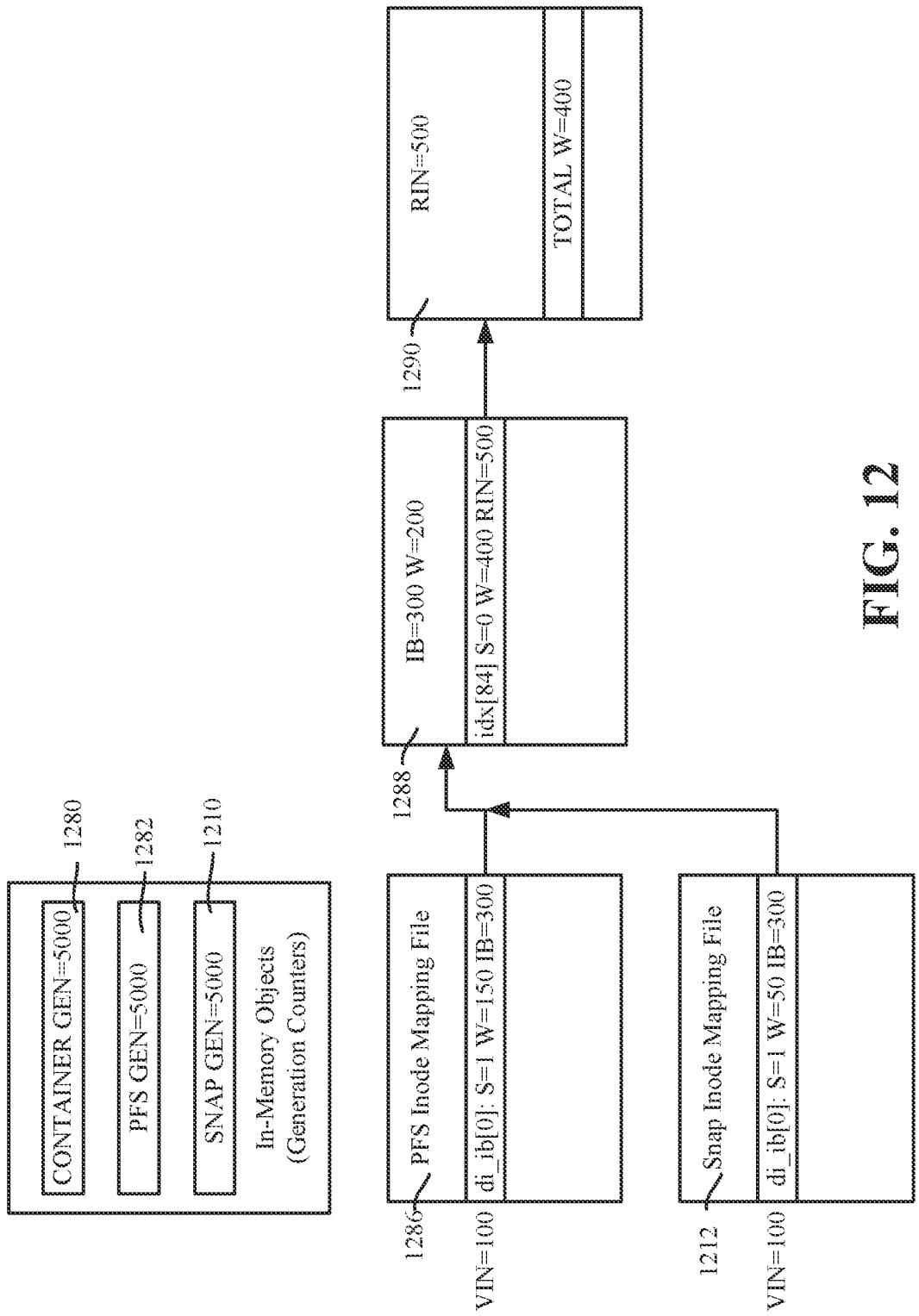
FIGS. 12 and 13 are representations of data structures over time in a scenario in which sharing exists at an intermediate indirect block level and a write operation is requested, in accordance with various aspects and implementations of the subject disclosure.
Figure 13:
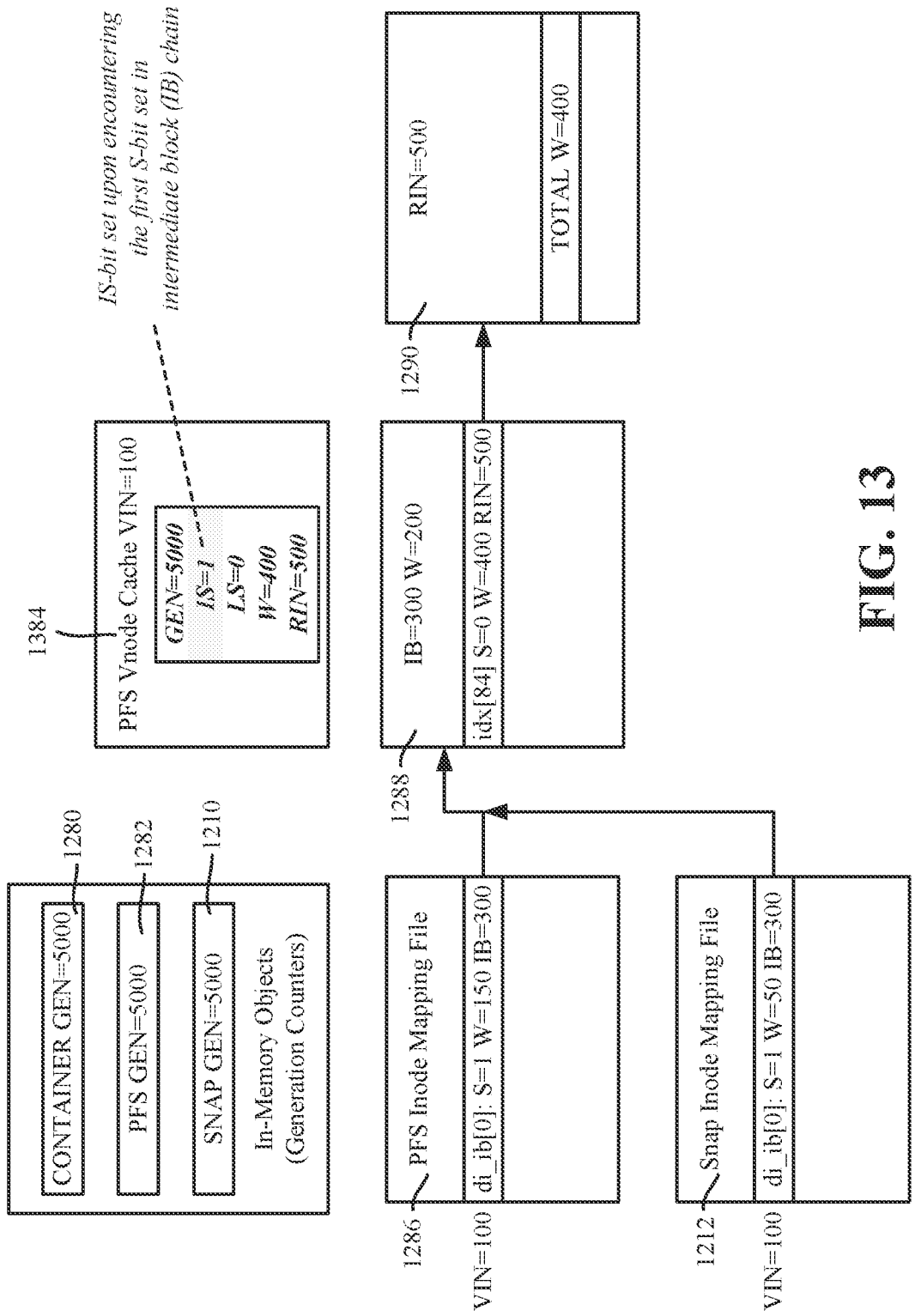

Another example is shown in FIGS. 12 and 13 to emphasize further operations of the logic of FIG. 8 in the event that the view's snap-gen-count equals the vnode's snap-gen-count. FIG. 12 shows a state of the files and data structures after creating and mounting the PFS, writing a file, and creating a snap of the PFS. In this example, the PFS is then remounted, which purges the caches corresponding to that view. A read operation is then requested of the file corresponding to VIN 100 from the PFS view.

Following the read request, as shown in FIG. 13, a PFS vnode cache 1384 entry is created for the VIN 100. This time, the IS bit in the PFS vnode cache entry 1384 is set during instantiation initialization, because the S bit in the inode mapping file 1286 was previously set as part of the earlier snap operation. In other words, the IS-bit in the PFS vnode cache entry 1384 is set upon encountering the first S-bit set in intermediate indirect block (IB) chain.

Consider thereafter that while the data is in the state of FIG. 13, a rewrite to the file corresponding to VIN 100 of the PFS view is requested. In this situation, a shared versus not shared decision is again needed, as shown in the decision logic of FIG. 8.

This time, operations 802 and 804 determine that the Vnode cache's snap-gen-count equals the view's snap-gen-count, as represented in FIG. 13, blocks 1282 and 1384. Thus, this part of the evaluation is indeterminate as to whether the inode is shared, and the determination process branches to operation 806.

Operation 806 evaluates the IS bit of the PFS vnode cache entry 1384. Because this IS bit is set, the real inode is shared, as represented via operation 806 branching to operation 814. In this example, again only in-memory data is evaluated, resulting in a highly efficient decision.

Figure 14:
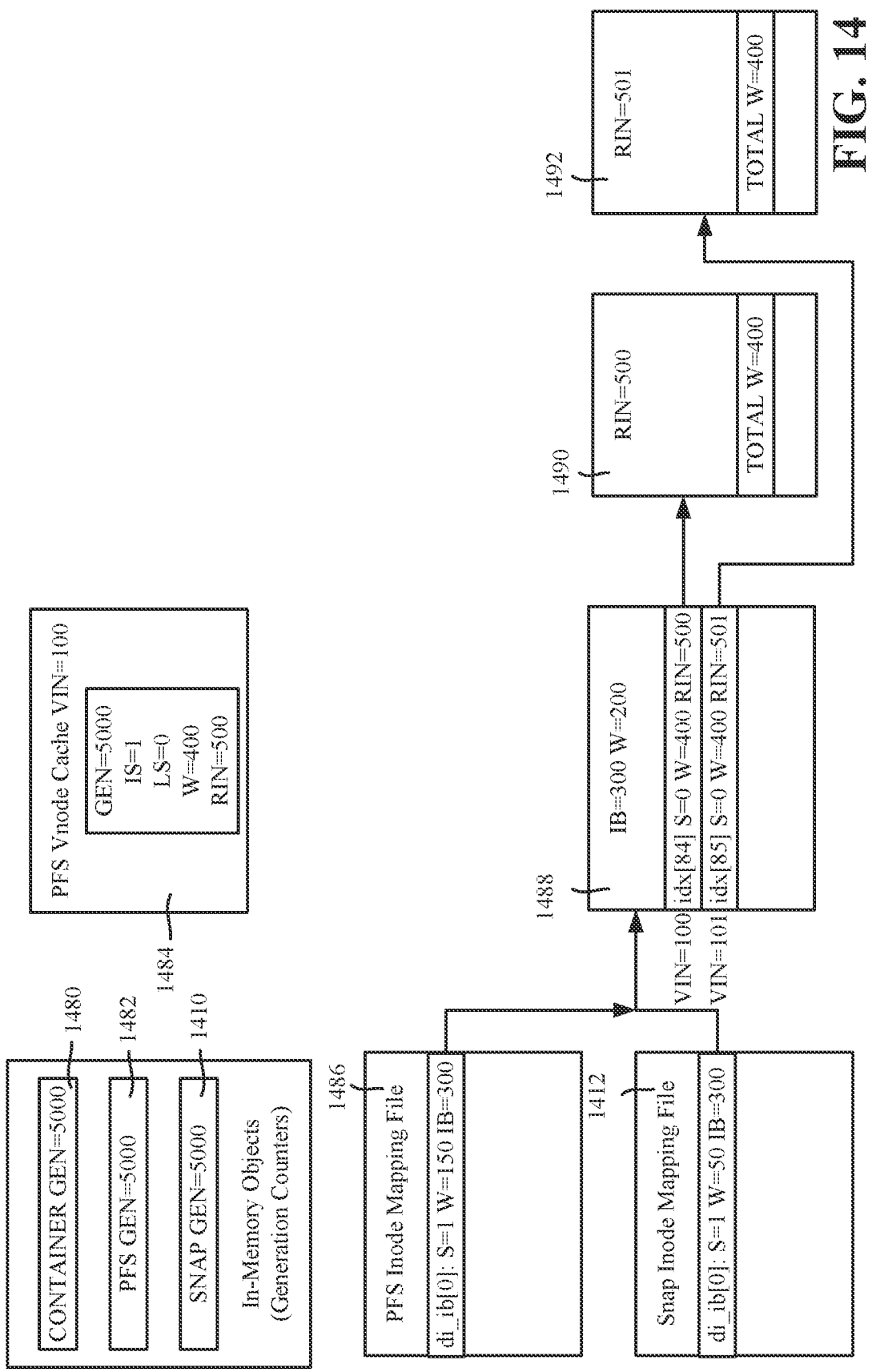
FIGS. 14-17 are representations of data structures over time, including when sharing exists at an inode level, in accordance with various aspects and implementations of the subject disclosure.

Turning to the other decision logic operations of FIG. 8, consider that general actions are performed that create and mount the primary filesystem, then write files in the PFS view that are referenced by VIN 100 and VIN 101. A snap is then created. The state of the data structures following these actions is shown in FIG. 14. As can be seen, both the PFS inode mapping file 1486 and the snap inode mapping file 1412 point to the leaf indirect block 1488. The two VINs 100 and 101 correspond to real inodes 1490 and 1492.

Figure 15:
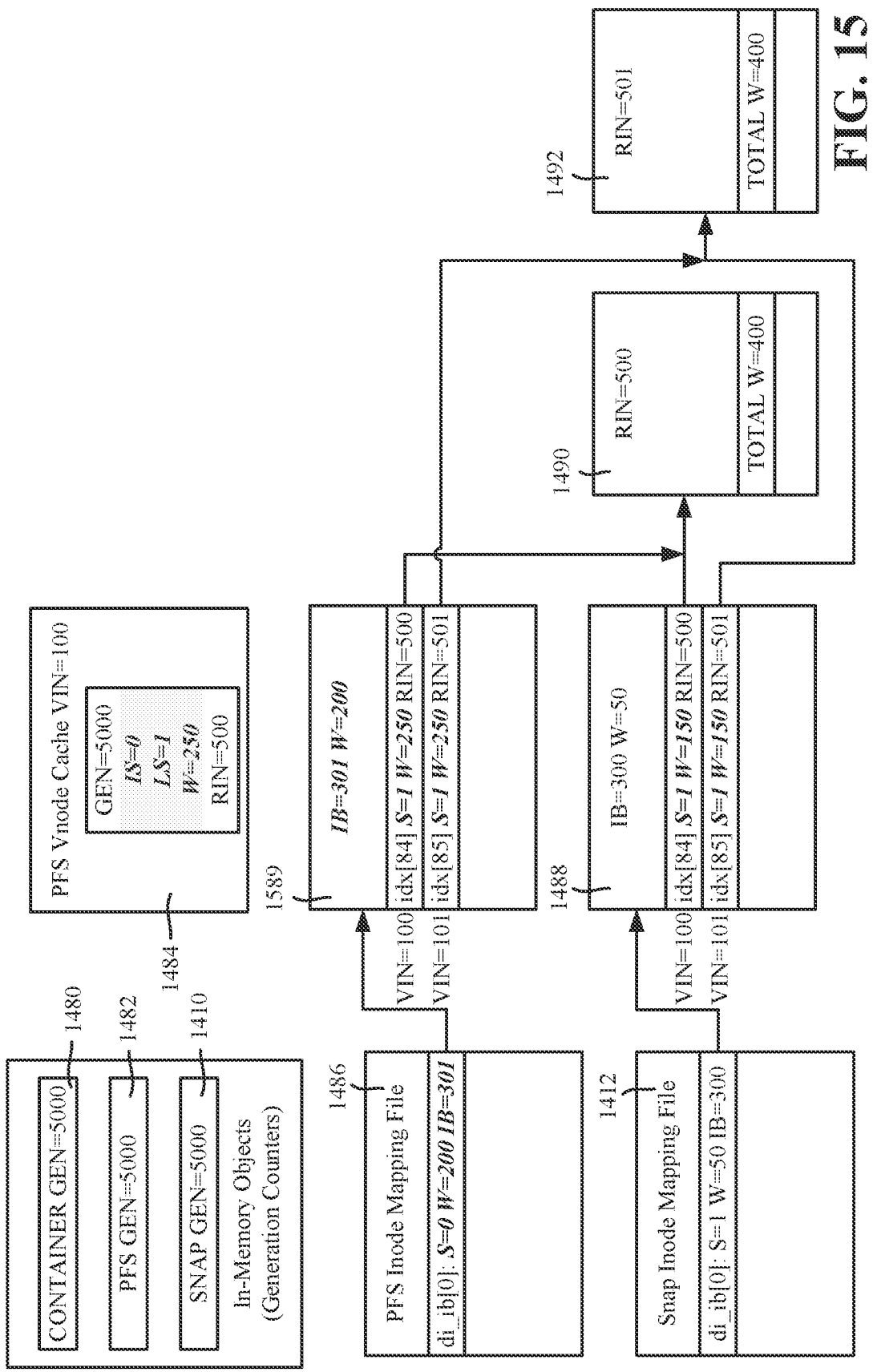

Thereafter, additional actions are to remount the filesystem (which clears the cached entry's dataset), read the file referenced by VIN 100, and rewrite the file referenced by VIN 100 (from the PFS view). The write causes a "test-and-make-own-mapping-chain" (TAMOMC) call, which splits the leaf indirect block into the original leaf indirect block 1488 (for the snap view) and allocates a new leaf indirect block 1589 for the PFS view, (with data copied from the original and the weights divided between the leaf indirect blocks 1488 and 1589) as shown in FIG. 15. Note that the pointers from the inode mapping files 1412 and 1486 can be to intermediate indirect blocks or leaf indirect blocks, (that is, not pointers to inodes); however in the example of FIG. 15 the indirect blocks 1488 and 1589 are shown as leaf indirect blocks. Further note that the weights in the leaf indirect blocks 1488 and 1589 are updated to sum to the total weights of their respective real inodes 1490 and 1492.

As can be seen, when this occurs, sharing is not at the intermediate indirect block level, as shown in the updated data entry in the PFS inode mapping file S=0 bit; (the snap's S-bit will be updated when next accessed). However, sharing is at the inode level, as the pointers from both indirect blocks 1488 and 1589 point to the same inodes. Thus, the dataset in the vnode cache entry 1484 has its IS bit cleared to zero to reflect that the leaf indirect block 1589 is not shared, and its LS bit set to 1 to indicate that there is sharing at the inode level. The weight in the dataset in the vnode cache entry 1484 is copied from the VIN 100 entry in the leaf indirect block 1589. At this point, the LS bit is set to 1 and the weight to 250. This indicates sharing (and which is detectable via operations 808 and 810 of FIG. 8).

Figure 16:
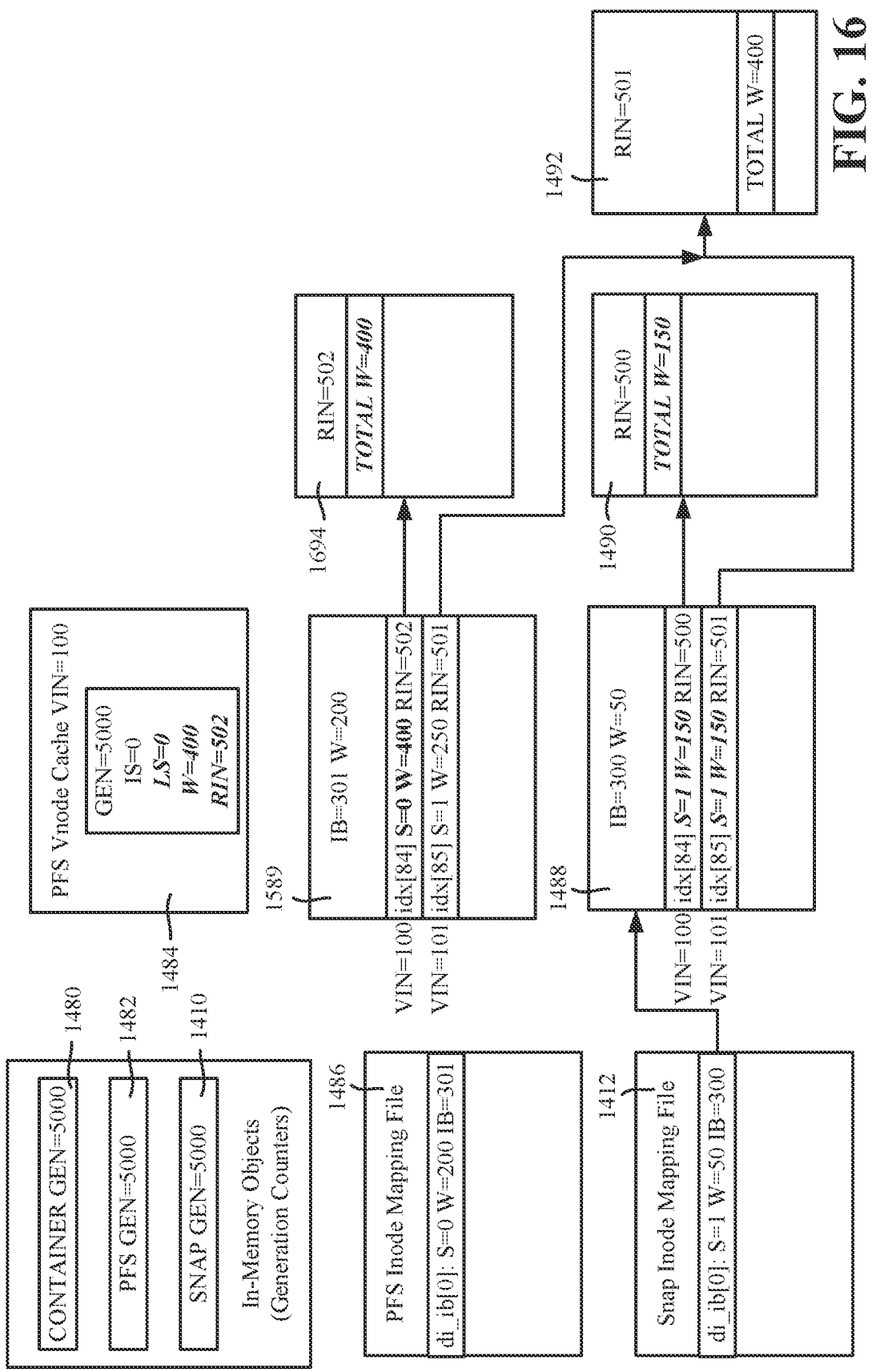

However, the write operation to VIN 100 means that the corresponding inode 1490 needs to be split. A "test-and-split real inode" (TASRIN) call is made, which splits the real inode 1490 into the original inode (unchanged) and allocates a new real inode 1694 (numbered RIN 502, with weight initialized equal to 400). This state of data is shown in FIG. 16, with the dataset for the vnode cache entry for VIN 100 updated with the new RIN and weight of 400. The LS bit, cleared to zero (0), indicates ownership.

Figure 17:
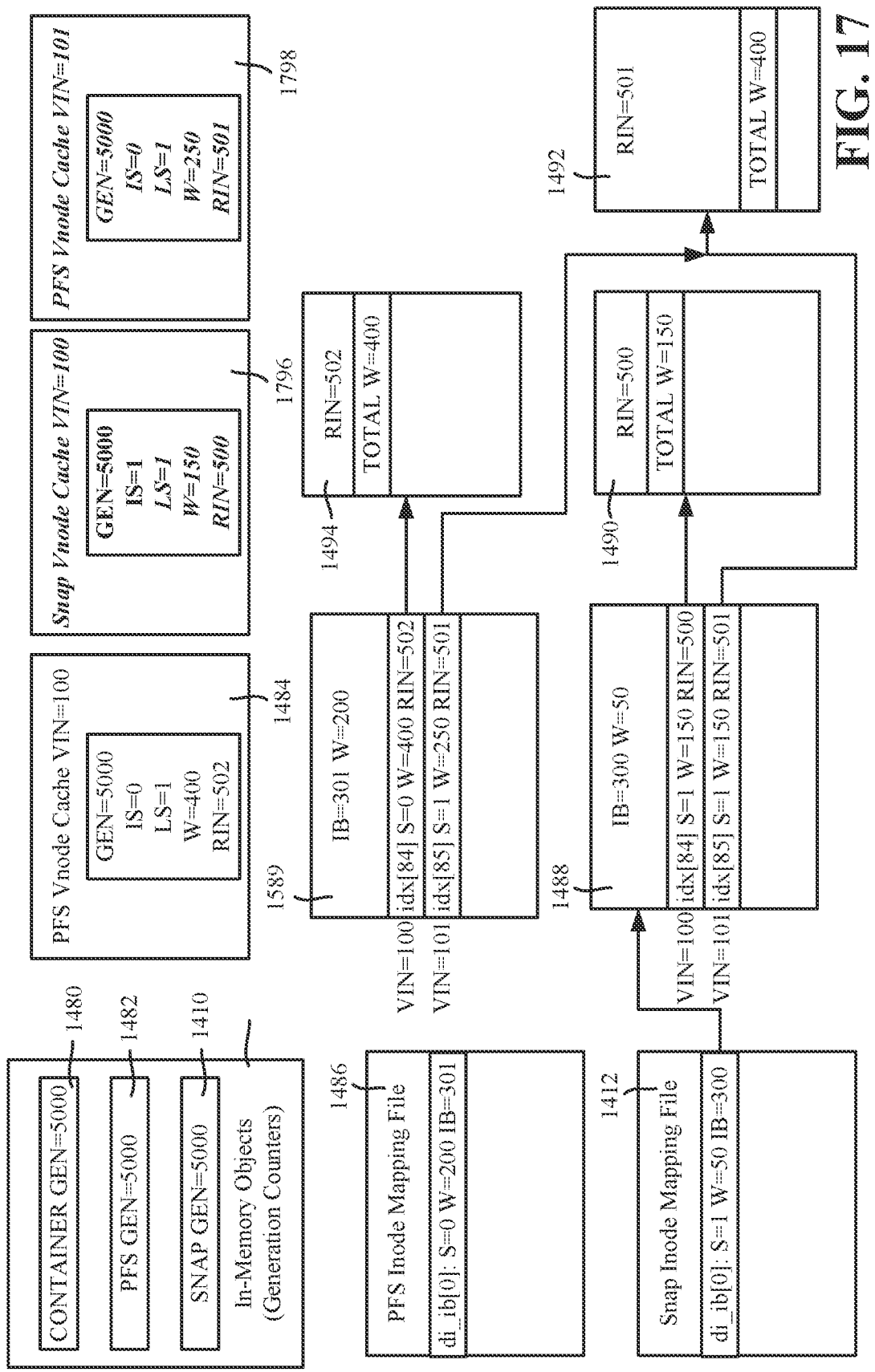

Consider a subsequent action is a read request from the snap view of VIN 100. When this occurs, a snap vnode cache entry 1796 is generated as shown in FIG. 17. The dataset of the snap vnode cache entry 1796 is initialized based on the chain to indicate intermediate indirect block level sharing, and sharing at the level of an inode, (as block 1488 is not updated for a read), and with the weight (equal to 150) of the real inode 1490.

This situation, in which the intermediate sharing bit is 1 but there is only one RIN for snap view's VIN 100 is classified as false sharing. Returning to FIG. 8, operation 804 (false, as the GEN counts are equal) and operation 806 (true) results in an inode split being initiated. However, the system will detect that the inode is owned, at back out of the split operation.

Consider another example, in which VIN 101 is accessed from the primary view for a write operation, resulting in the IS-bit being cleared to zero, and the LS-bit set to 1, as represented in block 1798 of FIG. 17. In the state shown in FIG. 17, sharing exists at the level of an inode. Returning to FIG. 8, operation 804 (false, as the GEN counts are equal) and operation 806 (false) results in the process branching to operation 808, where the LS bit is evaluated as true. However, as can be seen from FIG. 17, the LS bit by itself is not determinative, whereby operation 810 is performed. Operation 810 determines that the real inode needs to be split (operation 814), because the weight of 250 in the primary view's vnode cache entry 1798 does not equal the total weight of 400 in the RIN for VIN 101 in block 1492. Note that the actual real inode (e.g., on disk) need not be accessed for its total weight, because a copy of the real inode including the total weight exists in memory.

Thus, once the data structures are instantiated and initialized as described above, the operations of FIG. 8 can be performed using in-memory data structures. Thus, for data write and intrusive metadata write operations, which can be numerous and frequent, the following operations (corresponding to FIG. 8) efficiently determine the shared or owned state of a real inode:

```
if (vnode snap-gen-count != view snap-gen-count)
    {inode is shared}
else if (IS-bit is set)
    {inode is shared}
else if (LS-bit is set AND inode mapping pointer weight < inode total
weight)
    {inode is shared}
else
    {inode is owned}
```

Figure 18:
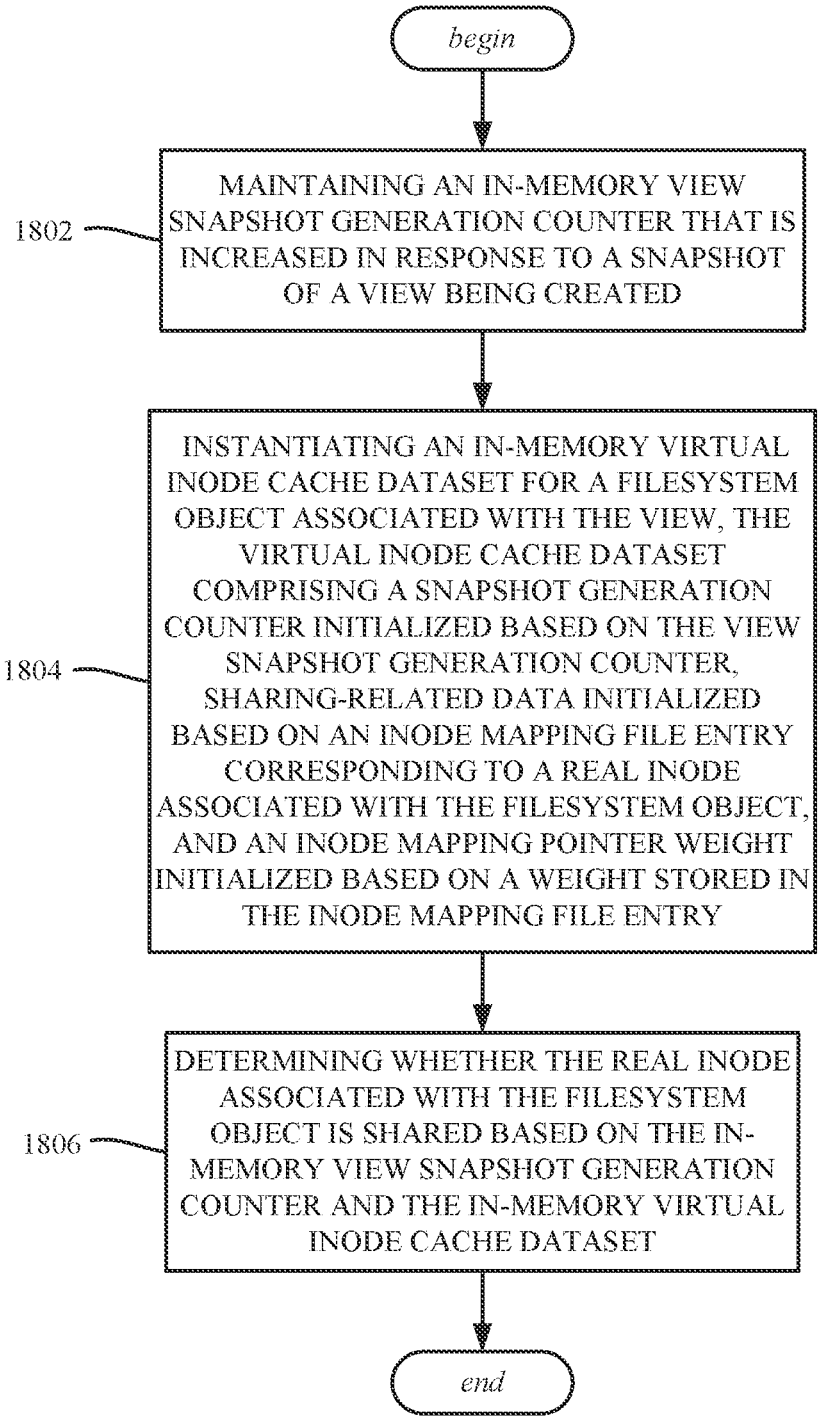
FIG. 18 is a flow diagram showing example operations related to determining whether an inode is shared based on in-memory data, in accordance with various aspects and implementations of the subject disclosure.

One or more aspects can be embodied in a system, such as represented in FIG. 18, and for example can comprise a memory that stores computer executable components and/or operations, and a processor that executes computer executable components and/or operations stored in the memory. Example operations can comprise operation 1802, which represents maintaining an in-memory view snapshot generation counter that is increased in response to a snapshot of a view being created. Operation 1804 represents instantiating an in-memory virtual inode cache dataset for a filesystem object associated with the view, the virtual inode cache dataset comprising a snapshot generation counter initialized based on the view snapshot generation counter, sharing-related data initialized based on an inode mapping file entry corresponding to a real inode associated with the filesystem object, and an inode mapping pointer weight initialized based on a weight stored in the inode mapping file entry. Operation 1806 represents determining whether the real inode associated with the filesystem object is shared based on the in-memory view snapshot generation counter and the in-memory virtual inode cache dataset.

Determining can determine that the real inode is shared based on determining that the snapshot generation counter in the virtual inode cache dataset does not equal the view snapshot generation counter.

The sharing-related data can comprise an intermediate shared value (e.g., an intermediate indirect block bit) set to a true state when sharing is at the level of an intermediate indirect block; the determining operation can determine that the real inode is shared based on the true state of the intermediate shared value.

Further operations can comprise maintaining an in-memory inode total weight corresponding to the real inode associated with the shared filesystem object; the sharing-related data can comprise a leaf shared value, the leaf shared value can be set to a true state in response to sharing being at the level of an inode, and determining can determine that the real inode is shared based on the true state of the leaf shared value and the inode mapping pointer weight being less than the in-memory inode total weight.

Determining can be performed on a data write to the filesystem object from the view, determining can determine that the real inode associated with the filesystem object is shared, and further operations can comprise allocating a new real inode based on the original real inode, and associating the filesystem object with the new real inode.

An intermediate shared value of the new real inode can be initialized to a false state.

The determining operation can be performed on a metadata write to metadata of the filesystem object from the view; and when the determining operation determines that the inode is shared, further operations can comprise allocating a new real inode based on the original real inode, and associating the shared filesystem object with the new real inode.

Instantiating the in-memory virtual inode cache dataset can be performed on a read of the filesystem object.

Figure 19:
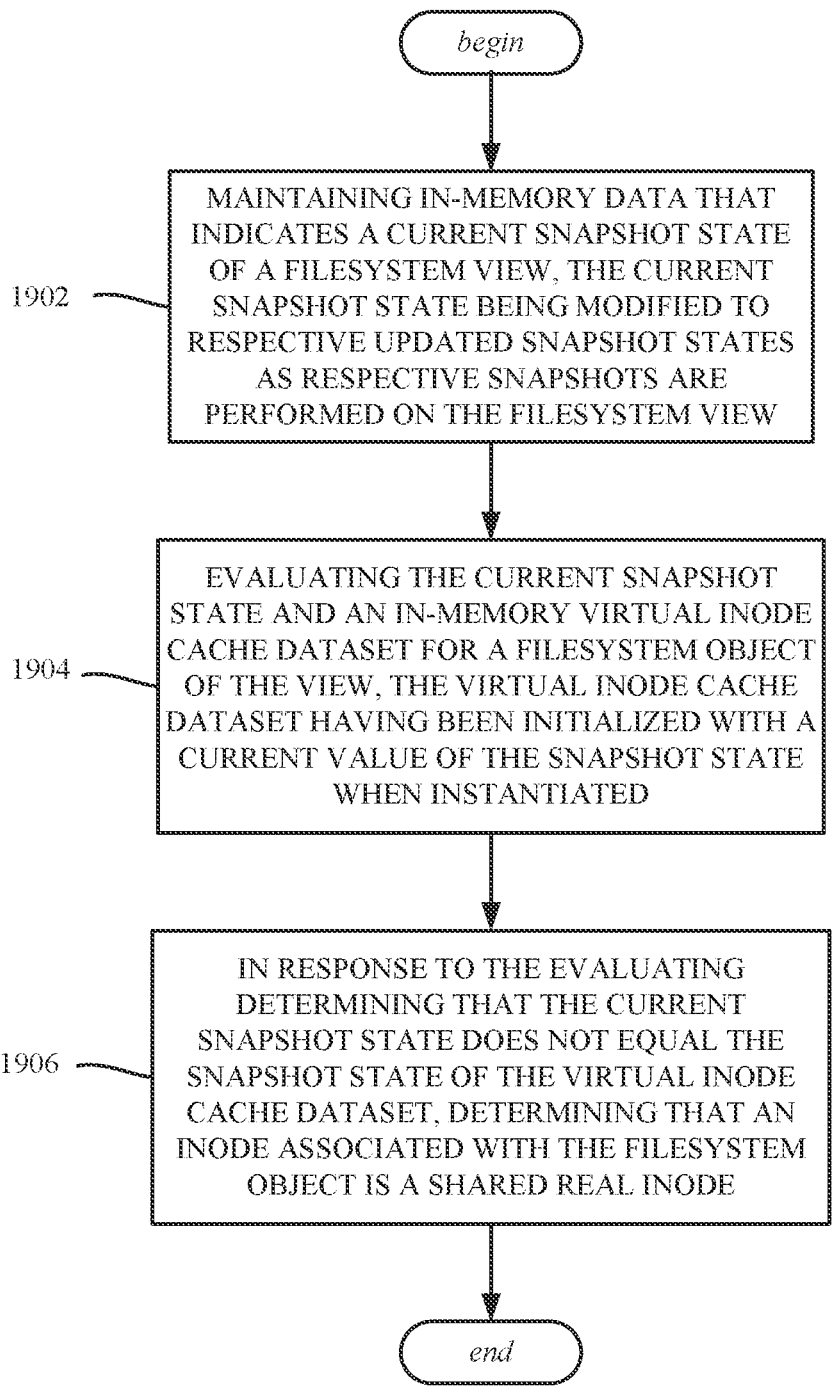
FIG. 19 is a flow diagram showing example operations related to evaluating in-memory data to determine whether an inode is shared, in accordance with various aspects and implementations of the subject disclosure.

One or more aspects can be embodied in a system, such as represented in FIG. 19, and for example can comprise a memory that stores computer executable components and/or operations, and a processor that executes computer executable components and/or operations stored in the memory. Example operations can comprise operation 1802, which represents maintaining in-memory data that indicates a current snapshot state of a filesystem view, the current snapshot state being modified to respective updated snapshot states as respective snapshots are performed on the filesystem view. Operation 1804 represents evaluating the current snapshot state and an in-memory virtual inode cache dataset for a filesystem object of the view, the virtual inode cache dataset having been initialized with a current value of the snapshot state when instantiated. Operation 1806 represents, in response to the evaluating determining that the current snapshot state does not equal the snapshot state of the virtual inode cache dataset, determining that an inode associated with the filesystem object is a shared real inode.

The current snapshot state can be maintained in a snapshot generation counter data structure.

Further operations can comprise, in response to determining that the current snapshot state is equal to the snapshot state of the virtual inode cache dataset, determining whether an intermediate shared value maintained in the in-memory virtual inode cache dataset indicates whether sharing exists at an intermediate indirect block level, and, in response to the determining that sharing exists at the intermediate indirect block level, determining that the real inode associated with the filesystem object is shared.

Further operations can comprise maintaining an in-memory inode total weight corresponding to the real inode associated with the shared filesystem object. If sharing is not determined to exist at the intermediate indirect block level, the determining operation can evaluate whether a leaf sharing value (e.g., a leaf sharing bit) maintained in the in-memory virtual inode cache dataset indicates that sharing may exist at an inode level. If sharing can exist at the inode level, the determining operation determines whether an inode mapping pointer weight maintained in the in-memory virtual inode cache dataset equals the in-memory inode total weight, and if not equal, the real inode associated with the filesystem object is determined to be shared.

Evaluating the current snapshot state and the in-memory virtual inode cache dataset can be performed in response to a data write operation to the filesystem object.

Evaluating the current snapshot state and the in-memory virtual inode cache dataset can be performed in response to a metadata write operation to metadata of the filesystem object.

The in-memory virtual inode cache dataset can be instantiated in response to a read of the filesystem object.

Figure 20:
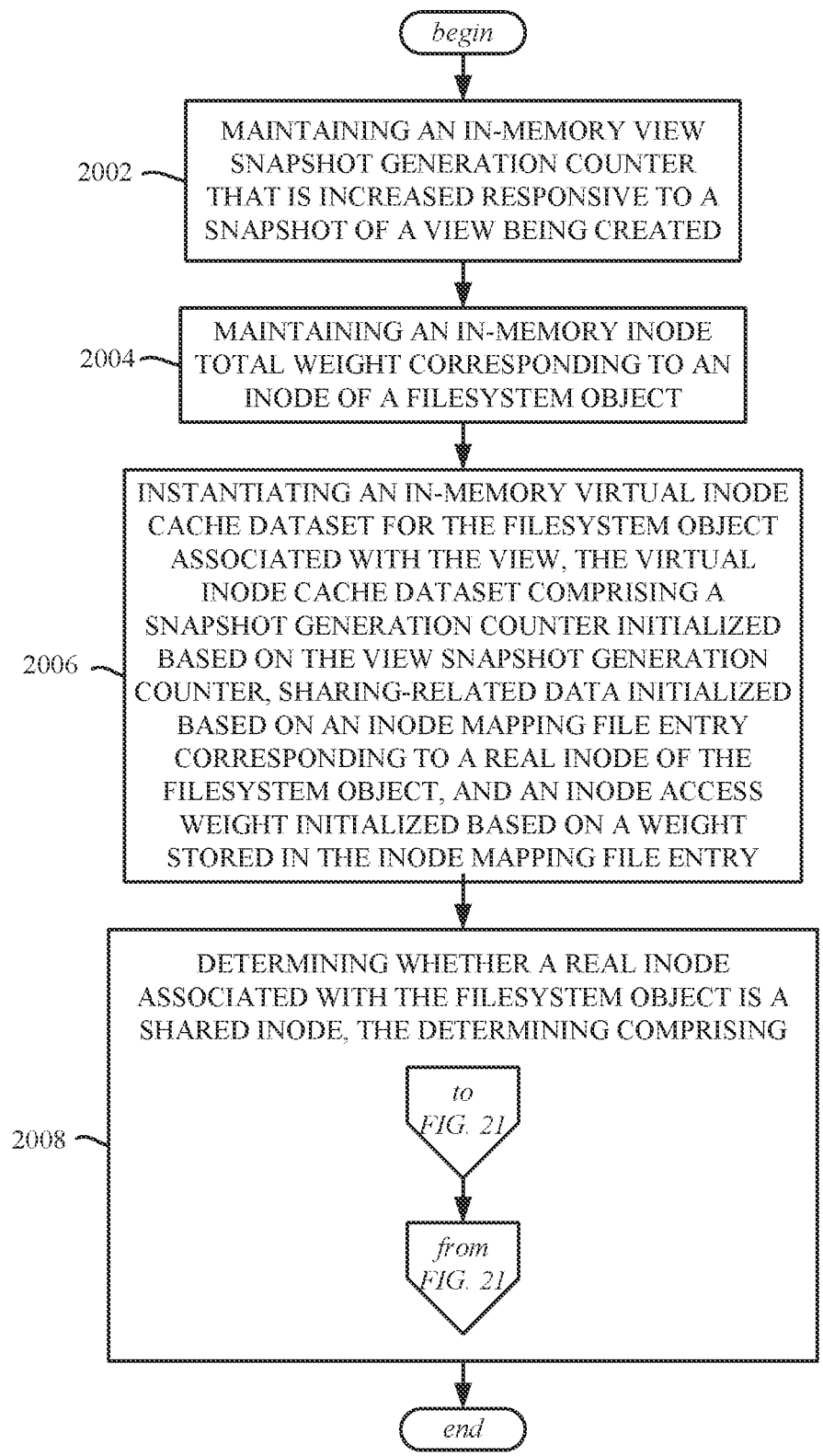
FIGS. 20 and 21 comprise a flow diagram showing example operations related to evaluating in-memory data to determine whether an inode is shared, in accordance with various aspects and implementations of the subject disclosure.
Figure 21:
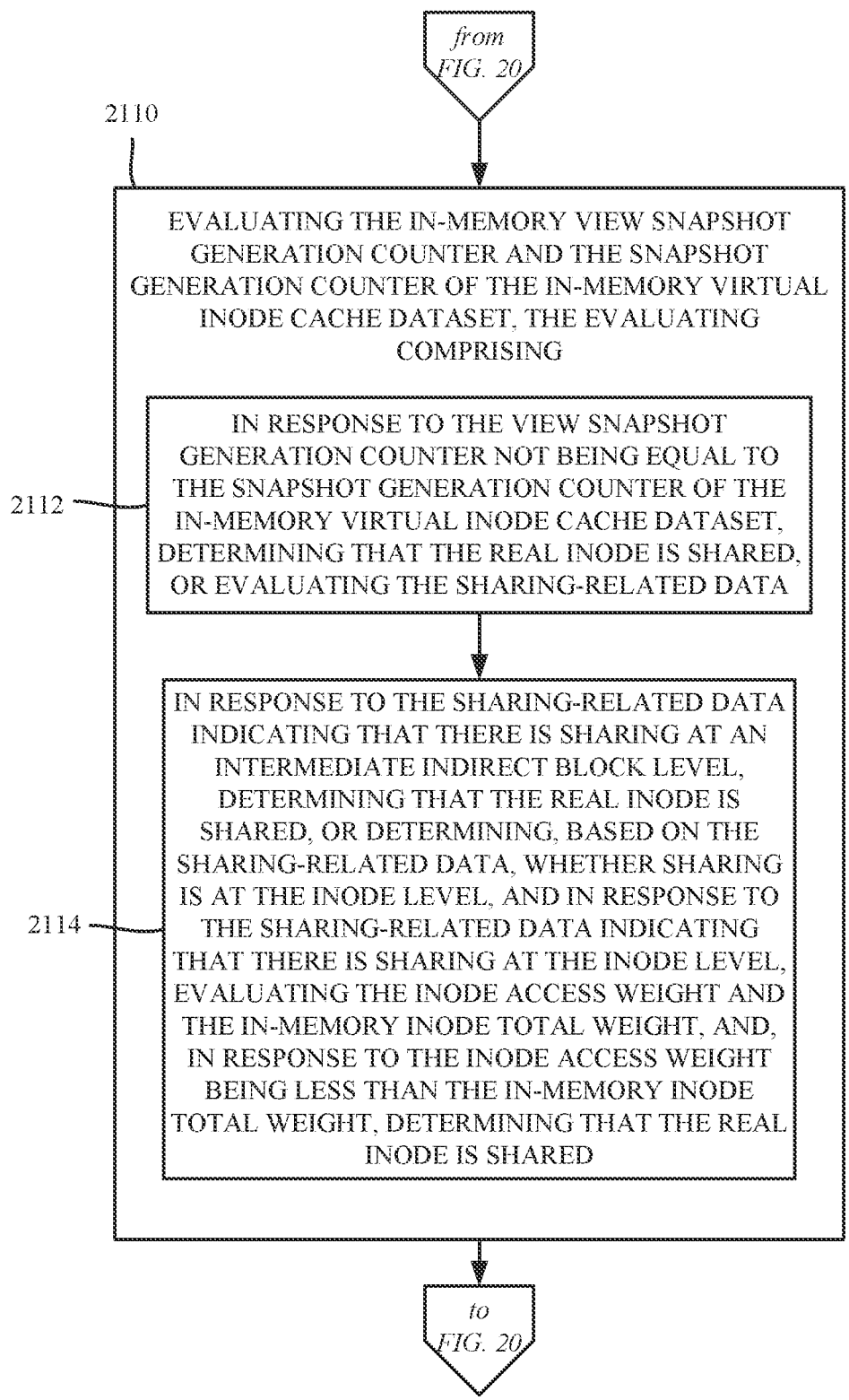

FIGS. 20 and 21 summarize various example operations, e.g., corresponding to a machine-readable storage medium, comprising executable instructions that, when executed by a processor, facilitate performance of operations. Operation 2002 represents maintaining an in-memory view snapshot generation counter that is increased responsive to a snapshot of a view being created. Operation 2004 represents maintaining an in-memory inode total weight corresponding to an inode of a filesystem object. Operation 2006 represents instantiating an in-memory virtual inode cache dataset for the filesystem object associated with the view, the virtual inode cache dataset comprising a snapshot generation counter initialized based on the view snapshot generation counter, sharing-related data initialized based on an inode mapping file entry corresponding to a real inode of the filesystem object, and an inode access weight initialized based on a weight stored in the inode mapping file entry Operation 2008 represents determining whether a real inode associated with the filesystem object is a shared inode, the determining comprising operation 2110 of FIG. 21, which represents evaluating the in-memory view snapshot generation counter and the snapshot generation counter of the in-memory virtual inode cache dataset. The evaluating of operation 2110 comprises, in response to the view snapshot generation counter not being equal to the snapshot generation counter of the in-memory virtual inode cache dataset, determining that the real inode is shared, or evaluating the sharing-related data (operation 2112), and in response to the sharing-related data indicating that there is sharing at an intermediate indirect block level, determining that the real inode is shared, or determining, based on the sharing-related data, whether sharing is at the inode level, and in response to the sharing-related data indicating that there is sharing at the inode level, evaluating the inode access weight and the in-memory inode total weight, and, in response to the inode access weight being less than the in-memory inode total weight, determining that the real inode is shared (operation 2114).

Determining can be performed on a data write to the filesystem object, determining can determine that the real inode associated with the filesystem object is shared, and further operations can comprise allocating a new real inode based on the original real inode, and associating the filesystem object with the new real inode.

Determining can be performed on a metadata write to metadata of the filesystem object, determining can determine that the real inode associated with the filesystem object is shared, and further operations can comprise allocating a new real inode based on the original real inode, and associating the filesystem object with the new real inode.

Evaluating the sharing-related data can be performed in response to the view snapshot generation counter being determined to be equal to the snapshot generation counter of the in-memory virtual inode cache dataset.

Determining, based on the sharing-related data whether sharing is at the inode level, can be performed in response to the sharing-related data indicating that there sharing does not exist at the intermediate indirect block level.

As can be seen, described herein is a technology that efficiently determines whether a real inode is a shared real inode or is owned. The technology is practical to implement, can be relatively lightweight and can operate using in-memory data structures.

Figure 22:
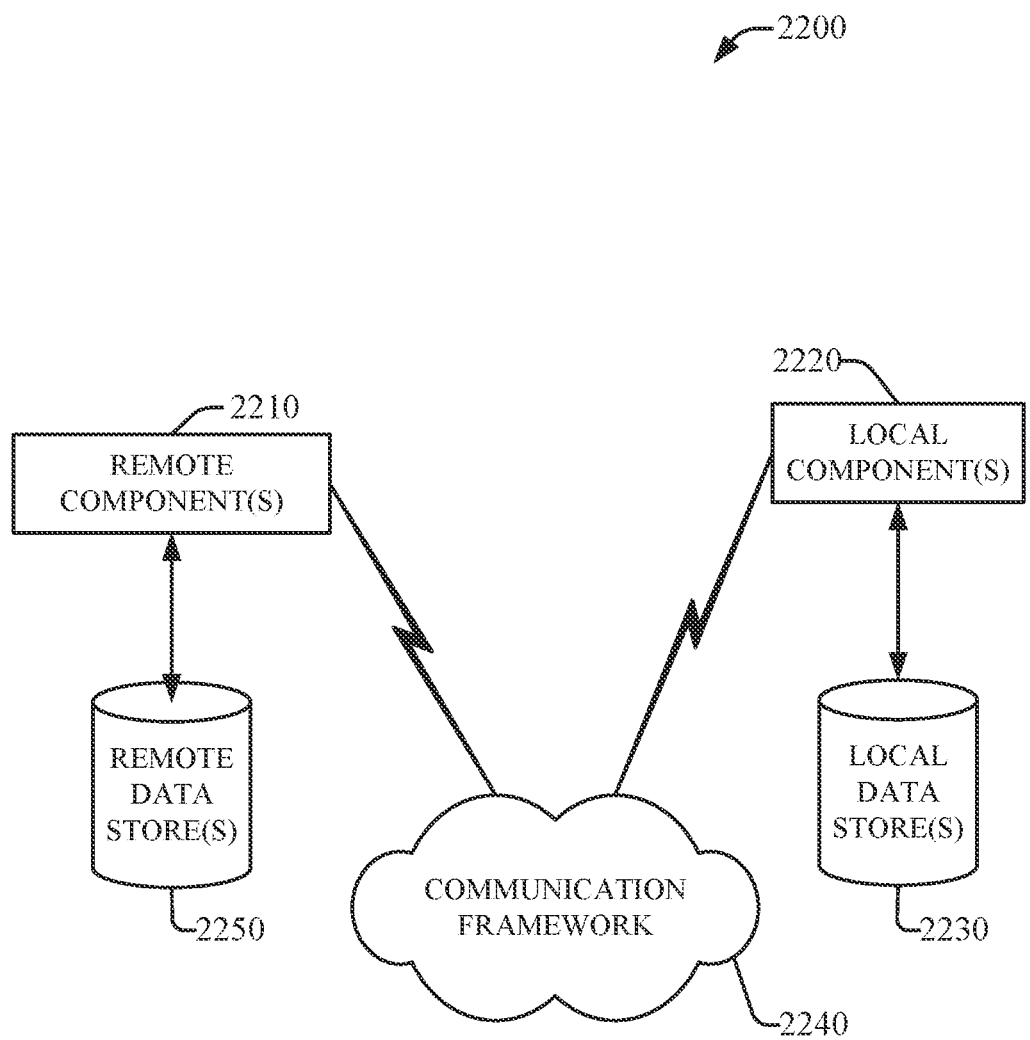
FIG. 22 is a block diagram representing an example computing environment into which aspects of the subject matter described herein may be incorporated.

FIG. 22 is a schematic block diagram of a computing environment 2200 with which the disclosed subject matter can interact. The system 2200 comprises one or more remote component(s) 2210. The remote component(s) 2210 can be hardware and/or software (e.g., threads, processes, computing devices). In some embodiments, remote component(s) 2210 can be a distributed computer system, connected to a local automatic scaling component and/or programs that use the resources of a distributed computer system, via communication framework 2240. Communication framework 2240 can comprise wired network devices, wireless network devices, mobile devices, wearable devices, radio access network devices, gateway devices, femtocell devices, servers, etc.

The system 2200 also comprises one or more local component(s) 2220. The local component(s) 2220 can be hardware and/or software (e.g., threads, processes, computing devices). In some embodiments, local component(s) 2220 can comprise an automatic scaling component and/or programs that communicate/use the remote resources 2210 and 2220, etc., connected to a remotely located distributed computing system via communication framework 2240.

One possible communication between a remote component(s) 2210 and a local component(s) 2220 can be in the form of a data packet adapted to be transmitted between two or more computer processes. Another possible communication between a remote component(s) 2210 and a local component(s) 2220 can be in the form of circuit-switched data adapted to be transmitted between two or more computer processes in radio time slots. The system 2200 comprises a communication framework 2240 that can be employed to facilitate communications between the remote component(s) 2210 and the local component(s) 2220, and can comprise an air interface, e.g., Uu interface of a UMTS network, via a long-term evolution (LTE) network, etc. Remote component(s) 2210 can be operably connected to one or more remote data store(s) 2250, such as a hard drive, solid state drive, SIM card, device memory, etc., that can be employed to store information on the remote component(s) 2210 side of communication framework 2240. Similarly, local component(s) 2220 can be operably connected to one or more local data store(s) 2230, that can be employed to store information on the local component(s) 2220 side of communication framework 2240.

Figure 23:
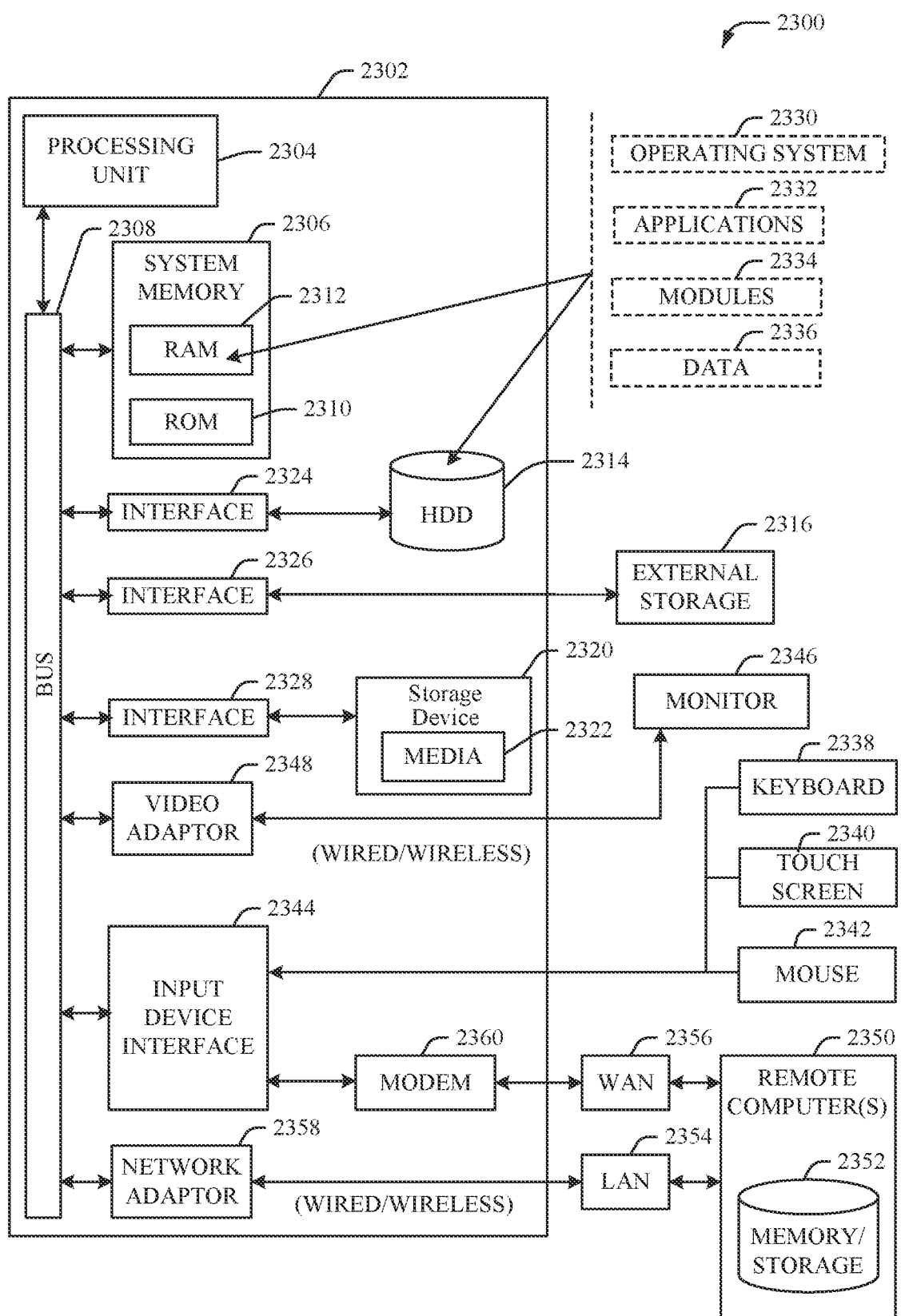
FIG. 23 depicts an example schematic block diagram of a computing environment with which the disclosed subject matter can interact/be implemented at least in part, in accordance with various aspects and implementations of the subject disclosure.

In order to provide additional context for various embodiments described herein, FIG. 23 and the following discussion are intended to provide a brief, general description of a suitable computing environment 2300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 23, the example environment 2300 for implementing various embodiments of the aspects described herein includes a computer 2302, the computer 2302 including a processing unit 2304, a system memory 2306 and a system bus 2308. The system bus 2308 couples system components including, but not limited to, the system memory 2306 to the processing unit 2304. The processing unit 2304 can be any of various commercially available processors. Dual microprocessors and other multi-processor architectures can also be employed as the processing unit 2304.

The system bus 2308 can be any of several types of bus structure that can further interconnect to a memory bus (with or without a memory controller), a peripheral bus, and a local bus using any of a variety of commercially available bus architectures. The system memory 2306 includes ROM 2310 and RAM 2312. A basic input/output system (BIOS) can be stored in a non-volatile memory such as ROM, erasable programmable read only memory (EPROM), EEPROM, which BIOS contains the basic routines that help to transfer information between elements within the computer 2302, such as during startup. The RAM 2312 can also include a high-speed RAM such as static RAM for caching data.

The computer 2302 further includes an internal hard disk drive (HDD) 2314 (e.g., EIDE, SATA), and can include one or more external storage devices 2316 (e.g., a magnetic floppy disk drive (FDD) 2316, a memory stick or flash drive reader, a memory card reader, etc.). While the internal HDD 2314 is illustrated as located within the computer 2302, the internal HDD 2314 can also be configured for external use in a suitable chassis (not shown). Additionally, while not shown in environment 2300, a solid state drive (SSD) could be used in addition to, or in place of, an HDD 2314.

Other internal or external storage can include at least one other storage device 2320 with storage media 2322 (e.g., a solid state storage device, a nonvolatile memory device, and/or an optical disk drive that can read or write from removable media such as a CD-ROM disc, a DVD, a BD, etc.). The external storage 2316 can be facilitated by a network virtual machine. The HDD 2314, external storage device(s) 2316 and storage device (e.g., drive) 2320 can be connected to the system bus 2308 by an HDD interface 2324, an external storage interface 2326 and a drive interface 2328, respectively.

The drives and their associated computer-readable storage media provide nonvolatile storage of data, data structures, computer-executable instructions, and so forth. For the computer 2302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2312, including an operating system 2330, one or more application programs 2332, other program modules 2334 and program data 2336. All or portions of the operating system, applications, modules, and/or data can also be cached in the RAM 2312. The systems and methods described herein can be implemented utilizing various commercially available operating systems or combinations of operating systems.

Computer 2302 can optionally comprise emulation technologies. For example, a hypervisor (not shown) or other intermediary can emulate a hardware environment for operating system 2330, and the emulated hardware can optionally be different from the hardware illustrated in FIG. 23. In such an embodiment, operating system 2330 can comprise one virtual machine (VM) of multiple VMs hosted at computer 2302. Furthermore, operating system 2330 can provide runtime environments, such as the Java runtime environment or the .NET framework, for applications 2332. Runtime environments are consistent execution environments that allow applications 2332 to run on any operating system that includes the runtime environment. Similarly, operating system 2330 can support containers, and applications 2332 can be in the form of containers, which are lightweight, standalone, executable packages of software that include, e.g., code, runtime, system tools, system libraries and settings for an application.

Further, computer 2302 can be enabled with a security module, such as a trusted processing module (TPM). For instance with a TPM, boot components hash next in time boot components, and wait for a match of results to secured values, before loading a next boot component. This process can take place at any layer in the code execution stack of computer 2302, e.g., applied at the application execution level or at the operating system (OS) kernel level, thereby enabling security at any level of code execution.

A user can enter commands and information into the computer 2302 through one or more wired/wireless input devices, e.g., a keyboard 2338, a touch screen 2340, and a pointing device, such as a mouse 2342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2304 through an input device interface 2344 that can be coupled to the system bus 2308, but can be connected by other interfaces, such as a parallel port, an IEEE 2394 serial port, a game port, a USB port, an IR interface, a BLUETOOTH® interface, etc.

A monitor 2346 or other type of display device can be also connected to the system bus 2308 via an interface, such as a video adapter 2348. In addition to the monitor 2346, a computer typically includes other peripheral output devices (not shown), such as speakers, printers, etc.

The computer 2302 can operate in a networked environment using logical connections via wired and/or wireless communications to one or more remote computers, such as a remote computer(s) 2350. The remote computer(s) 2350 can be a workstation, a server computer, a router, a personal computer, portable computer, microprocessor-based entertainment appliance, a peer device or other common network node, and typically includes many or all of the elements described relative to the computer 2302, although, for purposes of brevity, only a memory/storage device 2352 is illustrated. The logical connections depicted include wired/wireless connectivity to a local area network (LAN) 2354 and/or larger networks, e.g., a wide area network (WAN) 2356. Such LAN and WAN networking environments are commonplace in offices and companies, and facilitate enterprise-wide computer networks, such as intranets, all of which can connect to a global communications network, e.g., the Internet.

When used in a LAN networking environment, the computer 2302 can be connected to the local network 2354 through a wired and/or wireless communication network interface or adapter 2358. The adapter 2358 can facilitate wired or wireless communication to the LAN 2354, which can also include a wireless access point (AP) disposed thereon for communicating with the adapter 2358 in a wireless mode.

When used in a WAN networking environment, the computer 2302 can include a modem 2360 or can be connected to a communications server on the WAN 2356 via other means for establishing communications over the WAN 2356, such as by way of the Internet. The modem 2360, which can be internal or external and a wired or wireless device, can be connected to the system bus 2308 via the input device interface 2344. In a networked environment, program modules depicted relative to the computer 2302 or portions thereof, can be stored in the remote memory/storage device 2352. It will be appreciated that the network connections shown are example and other means of establishing a communications link between the computers can be used.

When used in either a LAN or WAN networking environment, the computer 2302 can access cloud storage systems or other network-based storage systems in addition to, or in place of, external storage devices 2316 as described above. Generally, a connection between the computer 2302 and a cloud storage system can be established over a LAN 2354 or WAN 2356 e.g., by the adapter 2358 or modem 2360, respectively. Upon connecting the computer 2302 to an associated cloud storage system, the external storage interface 2326 can, with the aid of the adapter 2358 and/or modem 2360, manage storage provided by the cloud storage system as it would other types of external storage. For instance, the external storage interface 2326 can be configured to provide access to cloud storage sources as if those sources were physically connected to the computer 2302.

The computer 2302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, cause the system to perform operations, the operations comprising:
   maintaining an in-memory virtual view snapshot generation counter that is increased in response to a snapshot of a virtual view being created, wherein a virtual inode is associated with at least one filesystem object represented in the virtual view;
   instantiating an in-memory virtual inode cache dataset for the filesystem object represented in the virtual view, the in-memory virtual inode cache dataset comprising:
   a snapshot generation counter initialized based on the in-memory virtual view snapshot generation counter,
   sharing-related data initialized based on an inode mapping file entry corresponding to a real inode associated with the filesystem object, resulting in a shared filesystem object, and
   an inode mapping pointer weight initialized based on a weight stored in the inode mapping file entry;
   maintaining an in-memory inode total weight corresponding to the real inode associated with the shared filesystem object, wherein the sharing-related data comprises a leaf shared value, and wherein the leaf shared value is indicative of whether sharing exists at a level of an inode; and
   determining whether the real inode associated with the filesystem object is shared among a group of virtual views based on the in-memory virtual view snapshot generation counter and the in-memory virtual inode cache dataset, wherein the determining determines that the real inode is shared based on determining that the leaf shared value and the inode mapping pointer weight are less than the in-memory inode total weight,
   wherein the virtual view is configured to allow access to select objects of the filesystem, and
   wherein the virtual inode maps to the real inode according to a table associated with the virtual view.

2. The system of claim 1, wherein the determining further determines that the real inode is shared based on determining that the snapshot generation counter in the in-memory virtual inode cache dataset does not equal the in-memory virtual view snapshot generation counter.

3. The system of claim 1, wherein the sharing-related data comprises an intermediate shared value, wherein the intermediate shared value is indicative of whether sharing exists at a level of an intermediate indirect block, and wherein the determining further determines that the real inode is shared based on the intermediate shared value.

4. The system of claim 1, wherein the real inode is an original real inode, wherein the determining is performed on a data write to the filesystem object represented in the virtual view, wherein the determining determines that the real inode associated with the filesystem object is shared, and wherein the operations further comprise allocating a new real inode based on the original real inode, and associating the filesystem object with the new real inode.

5. The system of claim 4, wherein an intermediate shared value of the new real inode is initialized to a value indicating sharing does not exist at the level of an inode.

6. The system of claim 1, wherein the real inode is an original real inode, wherein the determining is performed on a metadata write to metadata of the filesystem object represented in the virtual view, wherein the determining determines that the real inode is shared, and wherein the operations further comprise allocating a new real inode based on the original real inode, and associating the shared filesystem object with the new real inode.

7. The system of claim 1, wherein the instantiating the in-memory virtual inode cache dataset is performed on a read of the filesystem object.

8. The system of claim 1, wherein the real inode comprises an original real inode, wherein determining that he that the original real inode is shared is further based on a data write to the at least one filesystem object, and wherein the operations further comprise, based on the original real inode being shared, allocating a new real inode based on the original real inode, and associating the at least one filesystem object with the new real inode.

9. A system, comprising:
a processor; and
a memory that stores executable instructions that, when executed by the processor, cause the system to perform operations, the operations comprising:
maintaining in-memory data that indicates a current snapshot state of a virtual view, the current snapshot state being modified to respective updated snapshot states as respective snapshots are performed on the virtual view, wherein a virtual inode is associated with at least one filesystem object represented in the virtual view;
evaluating the current snapshot state and an in-memory virtual inode cache dataset for the filesystem object represented in the virtual view, the in-memory virtual inode cache dataset having been initialized with a current value of a dataset snapshot state of the in-memory virtual inode cache dataset when instantiated;
in response to the evaluating determining that the current snapshot state does not equal the dataset snapshot state, determining that a real inode associated with the filesystem object is a shared real inode, wherein the shared real inode is shared among a group of virtual views;
in response to determining that the real inode associated with the filesystem object is the shared real inode and receiving a write operation, splitting the shared real inode,
wherein the virtual view is configured to allow access to select objects of the filesystem, and
wherein a virtual inode maps to the real inode according to a table associated with the virtual view;
maintaining an in-memory inode total weight corresponding to the real inode associated with the filesystem object,
in response to determining that sharing does not exist at an intermediate indirect block level, determining whether a leaf node value maintained in the in-memory virtual inode cache dataset indicates that sharing exists at an inode level,
in response to determining that the leaf node value indicates that sharing exists at the inode level, determining whether an inode mapping pointer weight maintained in the in-memory virtual inode cache dataset equals the in-memory inode total weight, and
in response to determining that the inode mapping pointer weight does not equal the in-memory inode total weight, determining that the real inode associated with the filesystem object is shared.

10. The system of claim 9, wherein the current snapshot state is maintained in a snapshot generation counter data structure.

11. The system of claim 9, wherein the determining that sharing does not exist at the intermediate indirect block level comprises determining whether an intermediate shared value maintained in the in-memory virtual inode cache dataset indicates that sharing exists at the intermediate indirect block level.

12. The system of claim 9, wherein the evaluating the current snapshot state and the in-memory virtual inode cache dataset is performed in response to a data write operation to the filesystem object.

13. The system of claim 9, wherein the evaluating the current snapshot state and the in-memory virtual inode cache dataset is performed in response to a metadata write operation to metadata of the filesystem object.

14. The system of claim 9, wherein the in-memory virtual inode cache dataset is instantiated in response to a read of the filesystem object.

15. A non-transitory machine-readable medium, comprising executable instructions that, when executed by a processor, cause the performance of operations, the operations comprising:
maintaining an in-memory virtual view snapshot generation counter that is increased responsive to a snapshot of a virtual view being created, wherein a virtual inode is associated with at least one filesystem object represented in the virtual view;
maintaining an in-memory inode total weight corresponding to an inode of the filesystem object;
instantiating an in-memory virtual inode cache dataset for the filesystem object represented in the virtual view, the in-memory virtual inode cache dataset comprising:
a snapshot generation counter initialized based on the in-memory virtual view snapshot generation counter,
sharing-related data initialized based on an inode mapping file entry corresponding to a real inode of the filesystem object, and
an inode access weight initialized based on a weight stored in the inode mapping file entry; and
determining whether the real inode associated with the filesystem object is a shared inode, wherein the shared inode is shared among a group of virtual views, the determining comprising:
evaluating the in-memory virtual view snapshot generation counter and the snapshot generation counter of the in-memory virtual inode cache dataset, the evaluating comprising:

in response to the in-memory virtual view snapshot generation counter not being equal to the snapshot generation counter of the in-memory virtual inode cache dataset, determining that the real inode is shared, or evaluating the sharing-related data, and in response to the sharing-related data indicating that there is sharing at an intermediate indirect block level, determining that the real inode is shared, or determining whether sharing is at an inode level, wherein the sharing-related data comprises a leaf shared value, and wherein the leaf shared value is indicative of whether sharing is at the inode level, and in response to the sharing-related data indicating that there is sharing at the inode level, evaluating the inode access weight and the in-memory inode total weight, and, in response to the leaf shared value and the inode access weight being less than the in-memory inode total weight, determining that the real inode is shared, wherein the virtual view is configured to allow access to select objects of a real filesystem, and wherein the virtual inode maps to the real inode according to a table associated with the virtual view.

16. The non-transitory machine-readable medium of claim 15, wherein the real inode is an original real inode, wherein the determining is performed on a data write to the filesystem object, wherein the determining determines that the real inode associated with the filesystem object is shared, and wherein the operations further comprise allocating a new real inode based on the original real inode, and associating the filesystem object with the new real inode.

17. The non-transitory machine-readable medium of claim 15, wherein the real inode is an original real inode, wherein the determining is performed on a metadata write to metadata of the filesystem object, wherein the determining determines that the real inode associated with the filesystem object is shared, and wherein the operations further comprise allocating a new real inode based on an original real inode, and associating the filesystem object with the new real inode.

18. The non-transitory machine-readable medium of claim 15, wherein the evaluating the sharing-related data is performed in response to the in-memory virtual view snapshot generation counter being determined to be equal to the snapshot generation counter of the in-memory virtual inode cache dataset.

19. The non-transitory machine-readable medium of claim 18, wherein the determining based on the sharing-related data whether sharing is at the inode level is performed in response to the sharing-related data indicating that sharing does not exist at the intermediate indirect block level.

20. The non-transitory machine-readable medium of claim 15, wherein the real inode comprises an original real inode, wherein determining that he that the original real inode is shared is further based on a data write to the at least one filesystem object, and wherein the operations further comprise, based on the original real inode being shared, allocating a new real inode based on the original real inode, and associating the at least one filesystem object with the new real inode.

* * * * *